United States Patent
Gleixner et al.

(10) Patent No.: US 11,712,649 B2
(45) Date of Patent: *Aug. 1, 2023

(54) CYCLONIC AIR FILTER ASSEMBLY FOR AN ENGINE

(71) Applicant: Briggs & Stratton, LLC, Wauwatosa, WI (US)

(72) Inventors: Steven G. Gleixner, Brookfield, WI (US); Robert Johnson, New Berlin, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,130

(22) Filed: Feb. 25, 2022

(65) Prior Publication Data

US 2022/0176286 A1 Jun. 9, 2022

Related U.S. Application Data

(63) Continuation of application No. 16/347,953, filed as application No. PCT/US2017/061147 on Nov. 10, 2017, now Pat. No. 11,260,328.

(Continued)

(51) Int. Cl.
*B01D 46/00* (2022.01)
*B01D 46/24* (2006.01)
(Continued)

(52) U.S. Cl.
CPC ......... *B01D 45/16* (2013.01); *B01D 46/0045* (2013.01); *B01D 46/24* (2013.01);
(Continued)

(58) Field of Classification Search
CPC ................ B01D 46/24; B01D 46/2403; B01D 46/2411; F02M 35/02; F02M 35/08;
(Continued)

(56) References Cited

U.S. PATENT DOCUMENTS

| | | |
|---|---|---|
| 5,918,576 A | 7/1999 | Ohoka et al. |
| 6,287,354 B1 | 9/2001 | Nozaki |

(Continued)

FOREIGN PATENT DOCUMENTS

| | | |
|---|---|---|
| CN | 1601076 A | 3/2005 |
| CN | 102226435 A | 10/2011 |

OTHER PUBLICATIONS

International Search Report and Written Opinion, PCT/US2017/061147, Briggs & Stratton Corporation (dated Jan. 23, 2018).

*Primary Examiner* — Minh Chau T Pham
(74) *Attorney, Agent, or Firm* — Foley & Lardner LLP

(57) ABSTRACT

An internal combustion engine includes an engine block, an air-fuel mixing device, and an air filter assembly. The air filter assembly includes a housing, a filter element, and a gap between the filter element and the housing. The housing includes a base and a cover which define an interior volume. The housing includes an outlet passage fluidly coupling a filtered air outlet to a final air outlet. The filter element divides the interior volume into a filtered volume and an unfiltered volume. The gap is configured to direct air in a first airflow pass before being filtered by the filter element. The filter element is configured to direct filtered air in a second airflow pass in a substantially opposite direction from the first airflow pass. The outlet passage is configured to direct filtered air into a third airflow pass in a substantially same direction as the first airflow pass.

20 Claims, 24 Drawing Sheets

Related U.S. Application Data

(60) Provisional application No. 62/460,032, filed on Feb. 16, 2017, provisional application No. 62/421,098, filed on Nov. 11, 2016.

(51) Int. Cl.
　　*B01D 46/48*　　(2006.01)
　　*F02M 35/02*　　(2006.01)
　　*F02M 35/022*　　(2006.01)
　　*F02M 35/024*　　(2006.01)
　　*B01D 45/16*　　(2006.01)
　　*F02M 35/08*　　(2006.01)
　　*B01D 50/20*　　(2022.01)

(52) U.S. Cl.
　　CPC ......... *B01D 46/2414* (2013.01); *B01D 46/48* (2013.01); *B01D 50/20* (2022.01); *F02M 35/02* (2013.01); *F02M 35/0214* (2013.01); *F02M 35/0223* (2013.01); *F02M 35/02483* (2013.01); *F02M 35/08* (2013.01); *F02M 35/086* (2013.01); *B01D 2265/026* (2013.01)

(58) Field of Classification Search
　　CPC ........... F02M 35/0223; F02M 35/0201; F02M 35/02483; F02M 35/0216; F02M 35/02416
　　USPC ...... 55/337, 347, 385.3, 498, 482, 443, 484, 55/502, 462–465; 123/198 E
　　See application file for complete search history.

(56) References Cited

U.S. PATENT DOCUMENTS

| | | | | |
|---|---|---|---|---|
| 7,524,349 | B2 | 4/2009 | Schrage et al. | |
| 7,914,609 | B2 | 3/2011 | Sullivan et al. | |
| 7,988,757 | B2 * | 8/2011 | Scott | B01D 46/2403 55/498 |
| 8,002,862 | B2 | 8/2011 | Schultink | |
| 8,038,756 | B2 | 10/2011 | Iddings et al. | |
| 8,052,780 | B2 * | 11/2011 | Rotter | F02M 35/0203 55/502 |
| 8,152,780 | B2 * | 4/2012 | Evans | A61M 39/281 251/4 |
| 8,419,834 | B2 | 4/2013 | Rotter et al. | |
| 8,801,819 | B2 | 8/2014 | Rotter et al. | |
| 8,808,432 | B2 * | 8/2014 | Rotter | B01D 46/2411 96/380 |
| 9,206,721 | B2 | 12/2015 | Rotter et al. | |
| 9,221,004 | B2 | 12/2015 | Iddings et al. | |
| 9,346,001 | B2 | 5/2016 | Kato et al. | |
| 9,359,982 | B2 * | 6/2016 | Oh | F02M 35/02491 |
| 11,260,328 | B2 * | 3/2022 | Gleixner | F02M 35/0214 |
| 2004/0187453 | A1 * | 9/2004 | Kuji | B01D 39/1676 55/498 |
| 2005/0125939 | A1 * | 6/2005 | Hansen | B01D 45/16 15/353 |
| 2007/0012274 | A1 | 1/2007 | Kawatani | |
| 2007/0122274 | A1 | 5/2007 | Moorman et al. | |
| 2009/0308250 | A1 | 12/2009 | Rotter et al. | |
| 2012/0110964 | A1 | 5/2012 | Alexander et al. | |
| 2014/0245708 | A1 | 9/2014 | Kawabe et al. | |
| 2021/0060471 | A1 * | 3/2021 | Ozono | B01D 46/521 |

\* cited by examiner

CYCLONIC AIR FILTER ASSEMBLY FOR AN ENGINE

CROSS-REFERENCE TO RELATED APPLICATIONS

This application is a continuation of U.S. application Ser. No. 16/347,953, filed May 7, 2019, now U.S. Pat. No. 11,260,328 B2, which claims priority to PCT Application No. PCT/US2017/061,147 filed Nov. 10, 2017, which claims the benefit of and priority to U.S. Provisional Application No. 62/421,098, filed Nov. 11, 2016, and U.S. Provisional Application No. 62/460,032, filed Feb. 16, 2017, all of which are hereby incorporated by reference in their entireties.

BACKGROUND

The present application generally relates to the field of air filters and air filter assemblies, such as those for use with internal combustion engines.

An internal combustion engine typically includes an air filter for removing debris, including, dust, dirt, grass clippings, etc. from air entering the engine for combustion processes. The air filter assembly may be housed in a case and include a filter element, which includes filter media, such as filter paper, foam, mesh, or other media. After passing through the filter media, the filtered air is routed to a carburetor or other air-fuel mixing device to be mixed with fuel and then to a combustion chamber of the engine. Removing debris from the air helps to preserve the moving components of the engine, such as the piston and crankshaft, avoiding excess friction and wear, as well as preventing clogging of the fuel delivery system.

SUMMARY

One embodiment of the invention includes an internal combustion engine. The internal combustion engine includes an engine block including a cylinder and an air-fuel mixing device configured to provide an air-fuel mixture to the cylinder. The air filter assembly is configured to provide filtered air to the air-fuel mixing device. The air filter assembly includes a housing, a filter element, and a gap between the filter element and the housing. The housing includes a base and a cover. The base and the cover define an internal volume. The housing includes an air intake, a filtered air outlet, and an outlet passage fluidly coupling the filtered air outlet to a final air outlet. The filter element is positioned within the interior volume. The filter element divides the interior volume into a filtered volume and a unfiltered volume. The gap is configured to direct filtered air in a first airflow pass before being filtered by the filter element. The filter element is configured to direct filtered air in a second airflow pass in a substantially opposite direction from the first airflow pass. The outlet passage is configured to direct filtered air into a third airflow pass in a substantially same direction as the first airflow pass.

In some embodiments, the cover is configured to releasably fasten to the base. In some embodiments, the housing comprises a first housing end portion and a second housing end portion.

In some embodiments, the base includes the air intake, the filtered air outlet, and the outlet passage.

In some embodiments, the first housing end portion includes the air intake and the filtered air outlet. In some embodiments, the second housing end portion includes a debris outlet configured to allow debris and air to exit the housing.

In some embodiments, the gap is configured to direct air in the first airflow pass in a direction from the first housing end portion toward the second housing end portion.

In some embodiments, the housing includes a plurality of ribs formed in the cover and the base to direct air from the air intake toward a debris outlet formed in the base.

In some embodiments, the air filter assembly includes a trough formed in the base near the debris outlet, wherein the trough narrows from an entrance to an exit and is configured to direct debris toward the debris outlet.

In some embodiments, the plurality of ribs extend more than halfway into the gap.

In some embodiments, the plurality of ribs in the cover comprise helical ribs and the plurality of ribs in the base comprise helical ribs.

In some embodiments, the plurality of ribs in the cover align with the plurality of ribs in the base to form a plurality of angled air channels within the housing.

In some embodiments, the first of the plurality of angled air channels is narrower than a remainder of the plurality of angled air channels. In some embodiments, the first of the plurality of angled air channels is positioned proximate the air intake such that air enters the first of the plurality of angled air channels before entering the remainder of the plurality of angled air channels.

In some embodiments, the air intake comprises an L-shape having a first portion and a second portion. In some embodiments, the first portion is configured to direct incoming air flow to substantially complete a first filtering pass within a first angled air channel before joining with incoming air flow from the second portion.

In some embodiments, the air filter assembly is oriented horizontally with the engine in a normal operating position.

Another embodiment of the invention includes an air filter assembly configured to provide filtered air to an engine. The air filter assembly includes a housing, a filter element, an air intake, a debris outlet, a filtered air outlet, a gap between the filter element and the housing, and a plurality of ribs. The housing includes a cover and a base. The cover and the base define an interior volume of the housing. The filter element is positioned within the volume and includes filter media. The filter element devices the interior volume into a filtered volume and an unfiltered volume. The air intake is formed in the base and is configured to allow air to flow into the housing. The debris outlet is formed in the base and is configured to allow debris and air to exit the housing. The filtered air outlet is formed in the base. The filtered air outlet is fluidly coupled to an air-fuel mixing device to allow filtered air to exit the housing and enter the air fuel-mixing device. The gap is configured to allow air to flow between the filter element and the housing. The plurality of ribs is configured to direct air to complete at least two cyclonic filtering passes within the gap before being filtered by the filter element.

In some embodiments, the plurality of ribs extend more than halfway into the gap.

In some embodiments, the plurality of ribs in the cover align with the plurality of ribs in the base to form a plurality of angled air channels within the housing.

In some embodiments, one of the plurality of angled air channels is narrower than a remainder of the plurality of angled air channels. In some embodiments, one of the plurality of angled air channels is positioned proximate the air intake such that incoming air enters the one of the plurality of angled air channels before entering the remainder of the plurality of angled air channels.

In some embodiments, the air filter assembly includes a trough formed in the base near the debris outlet.

In some embodiments, air flows into the housing from the air intake based on intake pressure pulses created from reciprocation of a piston.

Another embodiment of the invention includes an internal combustion engine. The engine includes an engine block including a cylinder, an air-fuel mixing device configured to provide an air fuel mixture to the cylinder, and an air filter assembly configured to provide filtered air to the air-fuel mixing device. The air filter assembly includes a housing, a filter element, an outlet passage, and an air intake. The housing includes a base and a cover. The cover is configured to releasably fasten to the base. The housing defining a first housing end portion and a second housing end portion. The base and the cover define an interior volume. The filter element is positioned within the interior volume. The filter element divides the interior volume into a filtered volume and an unfiltered volume. The outlet passage is formed in the base and fluidly couples a filtered air outlet to a final air outlet. The filtered air outlet is in fluid communication with the filtered volume of the filter element. The air intake is formed in the housing at the first housing end portion and is configured to allow air to flow into a gap between the filter element and the housing. The gap is configured to direct air within the gap in a first airflow pass in a direction from the first housing end portion toward the second housing end portion before being filtered by the filter element. The filter element is configured to direct the filtered air in a second airflow pass in a substantially opposite direction from the first airflow pass. The outlet passage is configured to direct filtered air into a third airflow pass in a substantially same direction as the first airflow pass.

Another embodiment of the invention includes an internal combustion engine. The engine includes an engine block including a cylinder, an air-fuel mixing device configured to provide an air-fuel mixture to the cylinder, and an air filter assembly configured to provide filtered air to the air-fuel mixing device. The air filter assembly includes a housing comprising a cover and a base, where the cover is configured to releasably fasten to the base and the cover and the base define an interior volume of the housing, and a filter element positioned within the interior volume comprising a first end portion, a second end portion, and filter media extending between the first end portion and the second end portion. The filter element divides the interior volume into a filtered volume and an unfiltered volume. A gap is formed between the filter element and the housing and is configured to allow air to flow between the filter element and the housing. An air intake is formed in the base and is configured to allow air to flow into the housing. A debris outlet is formed in the base and is configured to allow debris and air to exit the housing. A filtered air outlet is formed in the base and in fluid communication with the filtered volume of the filter element, where the filtered air outlet is fluidly coupled to the air-fuel mixing device to allow filtered air to exit the housing and enter the air-fuel mixing device. One or more ribs are formed in the cover and the base to direct an air flow from the air intake toward the debris outlet. The ribs are configured to direct the air flow to complete at least two cyclonic filtering passes within the gap before being filtered by the filter element. In some embodiments, the ribs extend more than halfway into the gap. In some embodiments, the ribs in the cover align with the ribs in the base to form one or more angled air channels within the housing. In some embodiments, first of the angled air channels is narrower than a remainder of the angled air channels. In some embodiments, the first of the angled air channels is positioned proximate the air intake such that incoming air enters the first of the angled air channels before entering the remainder of the angled air channels. In some embodiments, the air intake includes an L-shape having a first portion and a second portion. The first portion is configured to direct incoming air flow to substantially complete a cyclonic filtering pass within a first angled air channel before joining with incoming air flow from the second portion. In some embodiments, a target exit velocity of air exiting from the debris outlet is 30 feet per second. In some embodiments, air flow within the housing is substantially laminar during the at least two cyclonic filtering passes. In some embodiments, the filter media includes a debris-shedding filter media such that debris falls off the filter media due to engine vibrations at engine speeds up to an engine idle speed. In some embodiments, the filter media includes a debris-shedding filter media such that debris falls off the filter media due to engine vibrations within a predetermined frequency range. In some embodiments, the air intake extends linearly between a first surface and a second surface, where the second surface is an interior surface of the base. In some embodiments, the debris outlet includes a valve configured to open and close in response to changes in a pressure of the interior volume of the housing. In some embodiments, the air filter assembly further includes a trough formed in the base near the debris outlet, where the trough is configured to direct debris toward the debris outlet. In some embodiments, the air flows into the housing from the air intake based on intake pressure pulses created from reciprocation of a piston.

Another embodiment of the invention includes an air filter housing configured to use with an engine. The air filter housing includes a base including a base mounting flange and an air outlet conduit, where the base defines a first portion of an interior volume configured to receive a filter element, and where the base mounting flange includes a first fastener opening and the air outlet conduit includes a second fastener opening. The housing further includes a cover including a cover mounting flange, a third fastener opening, and a fourth fastener opening, where the cover defines a second portion of the interior volume, and where, in an attached configuration in which the base mounting flange is aligned with and in contact with the cover mounting flange, the first fastener opening is aligned with the third fastener opening and the second fastener opening is aligned with the fourth fastener opening. A first fastener is inserted into the first fastener opening and the third fastener opening and a second fastener inserted into the second fastener opening and the fourth fastener opening. In some embodiments, the second fastener opening is spaced apart from the base mounting flange. In some embodiments, an entrance to the first fastener opening is spaced apart from an entrance to the second fastener opening by a first distance. In some embodiments, the first fastener opening is threaded and wherein the second fastener opening is threaded. In some embodiments, the air filter housing further includes a first threaded insert positioned in the first fastener opening and a second threaded insert positioned in the second fastener opening. In some embodiments, the base mounting flange includes a channel configured to receive a gasket.

Another embodiment of the invention includes an air filter housing configured for use with an engine. The air filter housing includes a base defining a first portion of an interior volume configured to receive a filter element, where the base includes an air filter outlet in fluid communication with the interior volume and a final outlet configured to provide fluid communication to an air-fuel mixing device, and where the base includes an outlet conduit fluidly coupling the air filter outlet to the final outlet and at least a portion of the outlet conduit is located below the interior volume. The housing further includes a cover defining a second portion of the interior volume and configured to be removably attached to the base. In some embodiments, the base includes an elbow including a mounting flange configured to attach to the air-fuel mixing device, where the final outlet is formed in the mounting flange. In some embodiments, the elbow is an integral component of the base. In some embodiments, the elbow is attached to the base. In some embodiments, the elbow is ultrasonically welded to the base.

Another embodiment of the invention includes an air filter element configured for use with an air filter housing of an engine. The air filter element includes a first end portion having a first body and a boss extending outward away from the first body, where the first end portion is formed from a first material having a first hardness, a second end portion having a second body and defining an opening formed through the second body, where the second end portion is formed from a second material having a second hardness less than the first hardness, and filter media positioned between the first end portion and the second end portion. In some embodiments, an outer diameter of the boss is less than an outer diameter of the first body. In some embodiments, the outer diameter of the boss is at most half of the outer diameter of the first body. In some embodiments, the first material includes urethane foam and the second material comprises urethane foam. In some embodiments, the boss is centrally located on the first body.

Another embodiment of the invention includes an air filter assembly configured to provide filtered air to an engine. The air filter assembly includes a housing defining an interior volume configured to receive a filter element, where the housing includes first housing end portion having an air filter conduit in fluid communication with the interior volume and a second housing end portion, where the air filter conduit defines an air filter outlet and includes a crossbar positioned in the air filter outlet, a filter element including a first end portion having a first body and a boss extending outwardly away from the first body, a second end portion having a second body and an opening formed through the second body, and filter media positioned between the first end portion and the second end portion. In a first orientation of the filter element, the first end portion of the filter element is positioned near the first housing end portion with the boss in contact with the first end portion, and the second end portion of the filter element is positioned near the second housing end portion with a portion of the air filter conduit positioned within the opening. In a second orientation of the filter element, the first end portion of the filter element is positioned near the second housing end portion with the boss in contact with the crossbar of the air filter outlet, thereby preventing installation of the filter element within the interior volume. In some embodiments, the second housing end portion includes a wall located opposite the air filter conduit and in the first orientation of the filter element, the boss contacts the wall. In some embodiments, the second housing end portion includes a wall located opposite the air filter conduit and the wall includes a recess and in the first orientation of the filter element, at least a portion of the boss is positioned within the recess. In some embodiments, the first end portion is formed from a first material having a first hardness and the second end portion is formed from a second material having a second hardness less than the first hardness. In some embodiments, an outer diameter of the boss is less than an outer diameter of the first body. In some embodiments, the outer diameter of the boss is at most half of the outer diameter of the first body. In some embodiments, the first material includes urethane foam and wherein the second material includes urethane foam. In some embodiments, the boss is centrally located on the first body. In some embodiments, in the first orientation of the filter element, the first end portion of the filter element exerts a force on the air filter element directed toward the air filter conduit to form a seal between the second end portion of the filter element and the air filter conduit. In some embodiments, an outer diameter of the boss is less than an outer diameter of the first body. In some embodiments, the outer diameter of the boss is at most half of the outer diameter of the first body.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
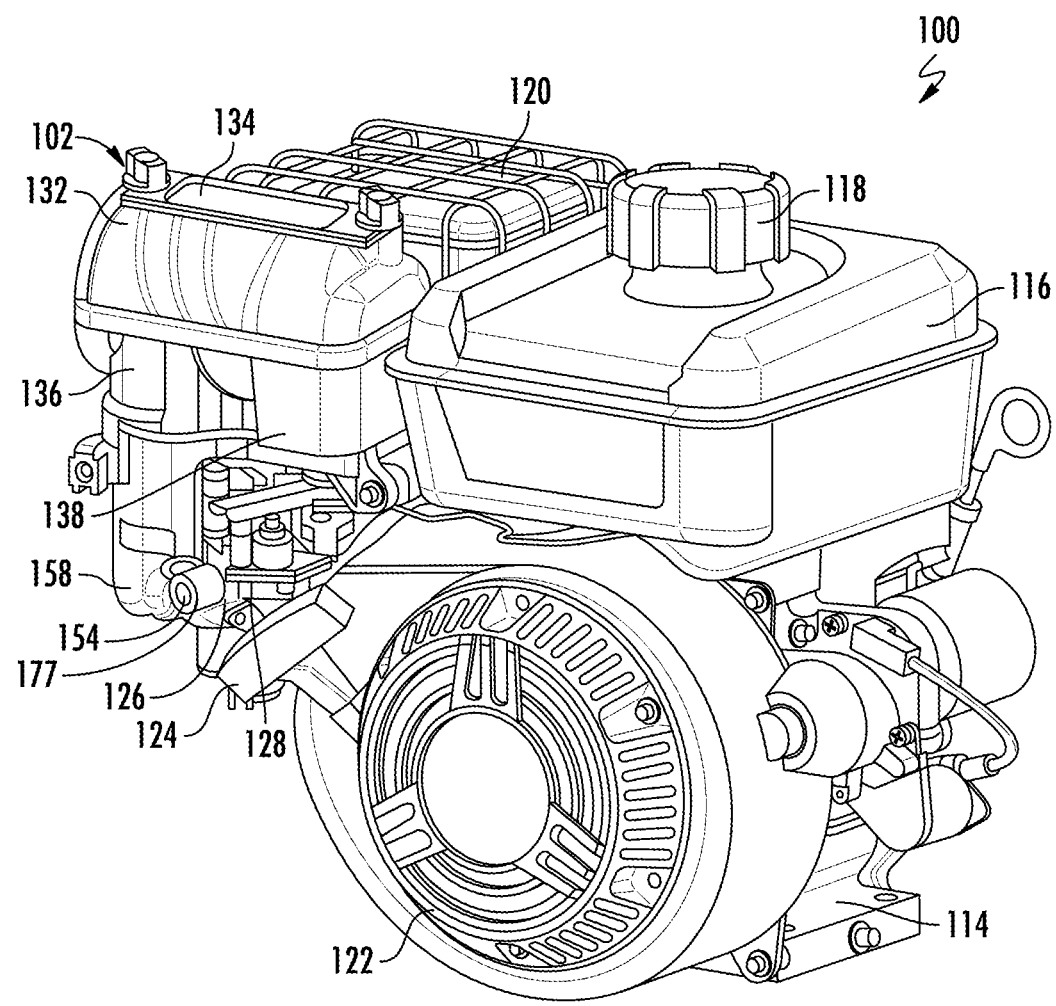
FIG. 1 is a perspective view of an internal combustion engine, according to an exemplary embodiment.
Figure 2:
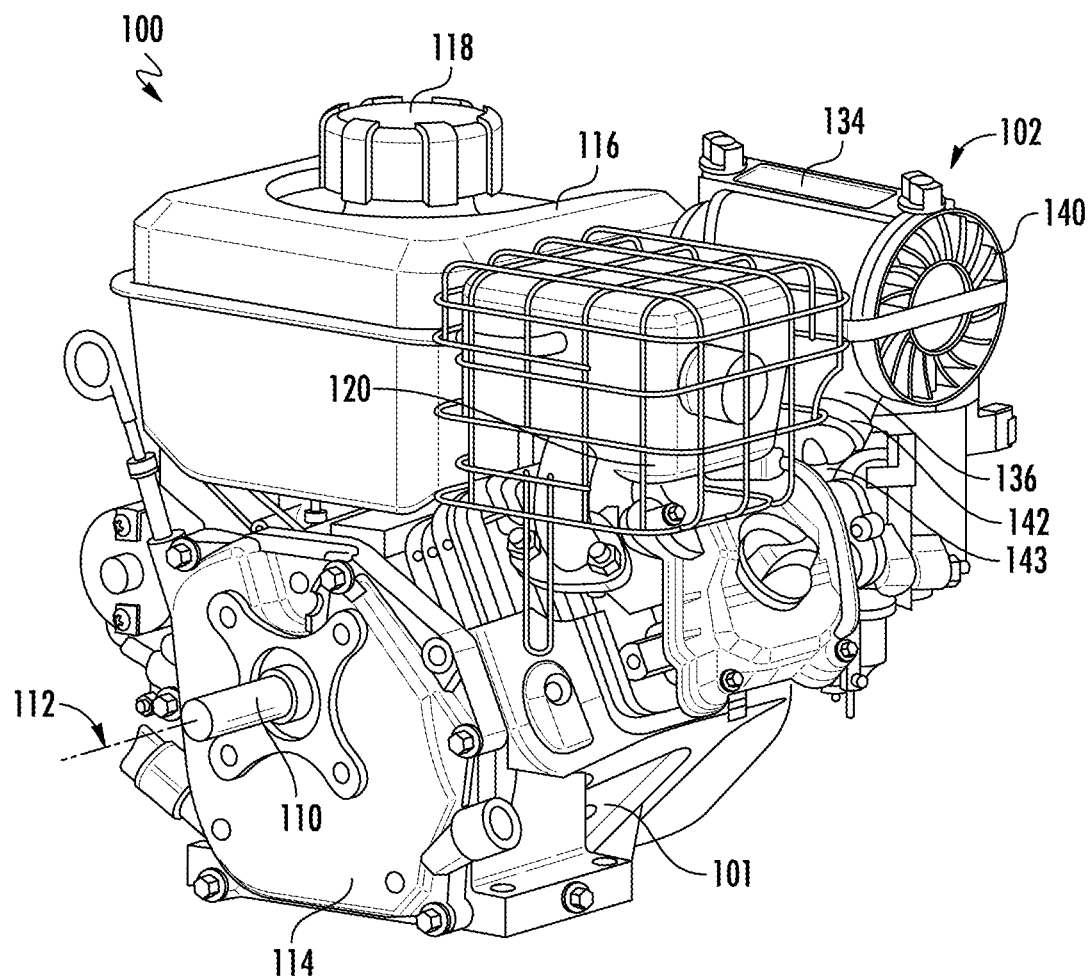
FIG. 2 is a rear perspective view of the internal combustion engine of FIG. 1.
Figure 3:
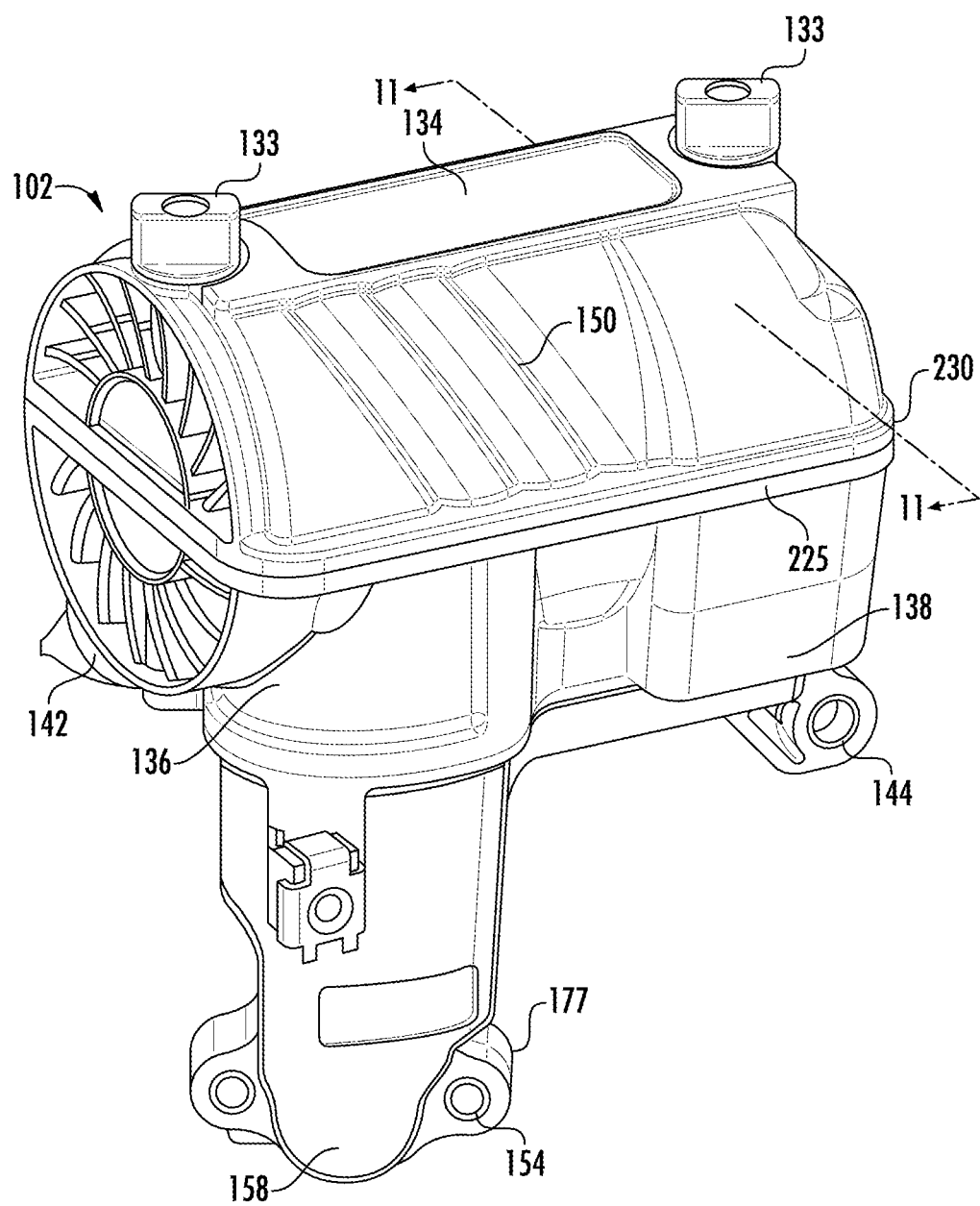
FIG. 3 is a perspective view of an air filter assembly, according to an exemplary embodiment.
Figure 4:
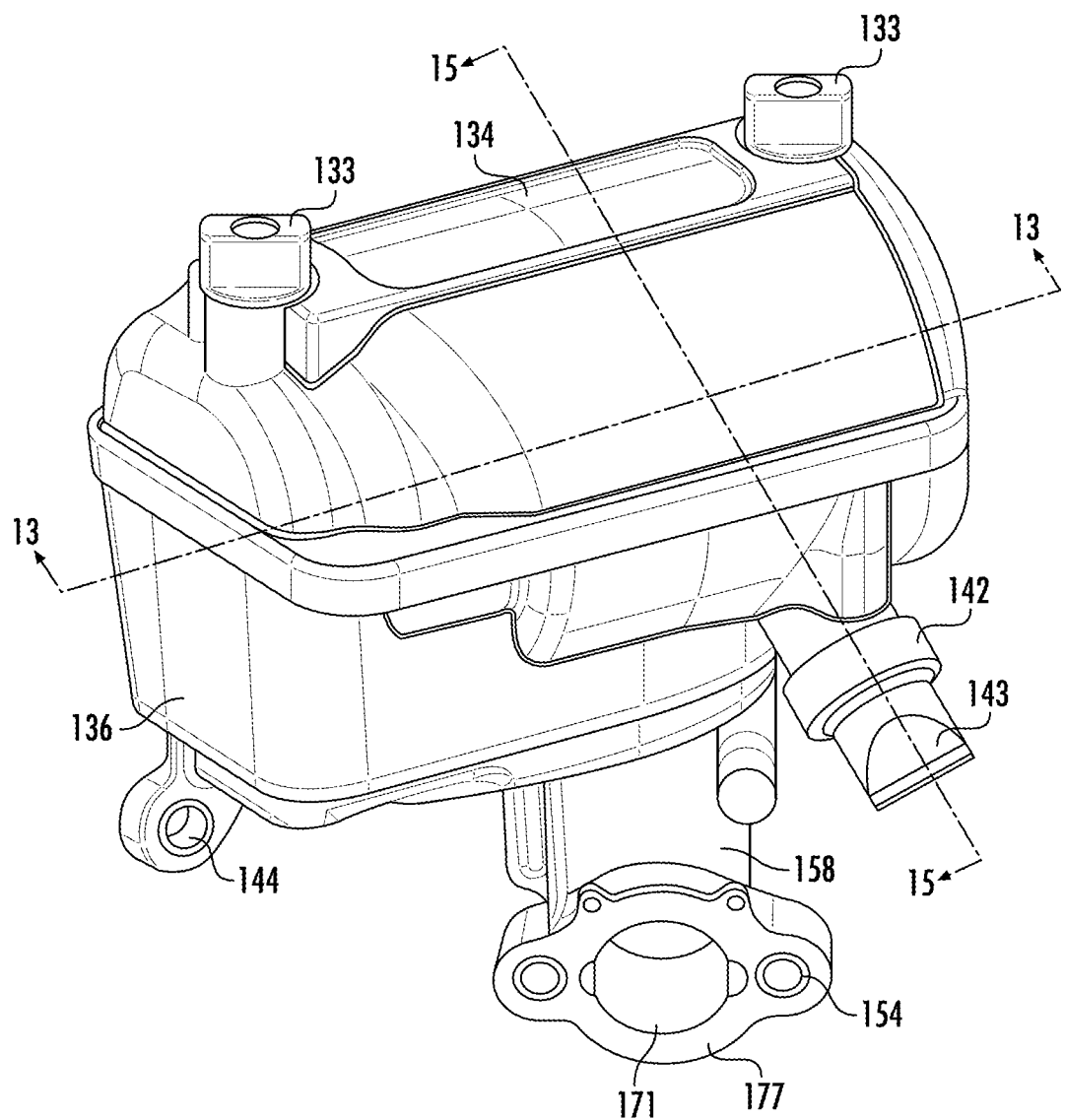
FIG. 4 is a rear perspective view of the air filter assembly of FIG. 3.

Referring to FIGS. 1-2, an engine shown as an internal combustion engine 100 is illustrated according to an exemplary embodiment. The internal combustion engine 100 includes an engine block 101 having one or more cylinders, cylinder heads, pistons, and a crankshaft 110. Each piston reciprocates in a cylinder along a cylinder axis to drive the crankshaft 110. The crankshaft 110 rotates about a crankshaft axis 112. The crankshaft 110 is positioned in part within a crankcase 114. In an exemplary embodiment, the crankshaft 110 may be oriented horizontally (i.e., a horizontal engine) with the engine 100 in its normal operating position. In other embodiments, the crankshaft 110 is vertically oriented (i.e., a vertical engine) with the engine 100 in its normal operating position. The engine may include one cylinder or two or more cylinders. The engine 100 also includes an air-fuel mixing device 128 for supplying an air-fuel mixture to the cylinder (e.g., a carburetor, an electronic fuel injection system, a fuel direct injection system, etc.), an air filter assembly 102, and a muffler 120.

The engine 100 can be used on a variety of end products, including outdoor power equipment, portable jobsite equipment, and standby or portable generators. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, etc. Outdoor power equipment may, for example, use the engine 100 to drive an implement, such as a rotary blade of a lawn mower, a pump of a pressure washer, an auger of a snow thrower, and/or a drivetrain of the outdoor power equipment. Portable jobsite equipment includes portable light towers, mobile industrial heaters, and portable light stands.

Referring to FIGS. 1-14, the engine 100 includes an air filter assembly 102 according to an exemplary embodiment. The air filter assembly 102 includes a filter element 160 positioned within a housing 132 formed by a cover 134 and a base 136. In an exemplary embodiment, the air filter assembly 102 is horizontally oriented such that the filter element 160 is horizontally positioned within the housing 132 with the engine 100 in its normal operating position. In some embodiments, the crankshaft 110 of the engine 100 is vertically oriented and the air filter assembly 102 is horizontally oriented. The air filter assembly 102 is configured to provide two stages of filtering of incoming air prior to supplying the filtered air to the engine 100 for combustion processes. The first filtering stage includes cyclonic filtering of incoming air through the air filter assembly 102. The cyclonic filtering is configured to remove large particles of debris prior to secondary filtering of the air. The second filtering stage includes filtering of the partially filtered air through the filter element 160 to remove smaller particles of debris from the incoming air. The filtered air is then sent to the air-fuel mixing device 128 of the engine 100 to be mixed with fuel prior to combustion in the cylinder of the engine 100. The air filter assembly 102 is positioned directly above the air-fuel mixing device 128 of the engine 100.

Figure 9:
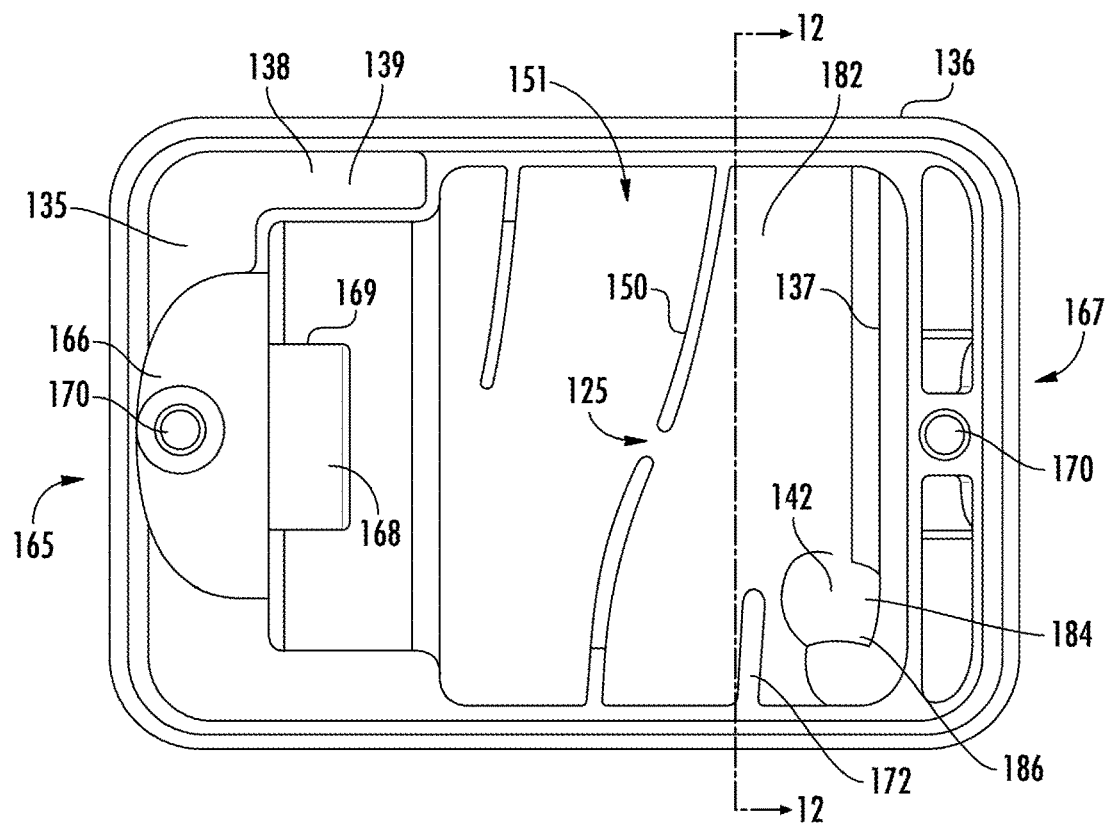
FIG. 9 is a top view of a base of the air filter assembly of FIG. 3.
Figure 10:
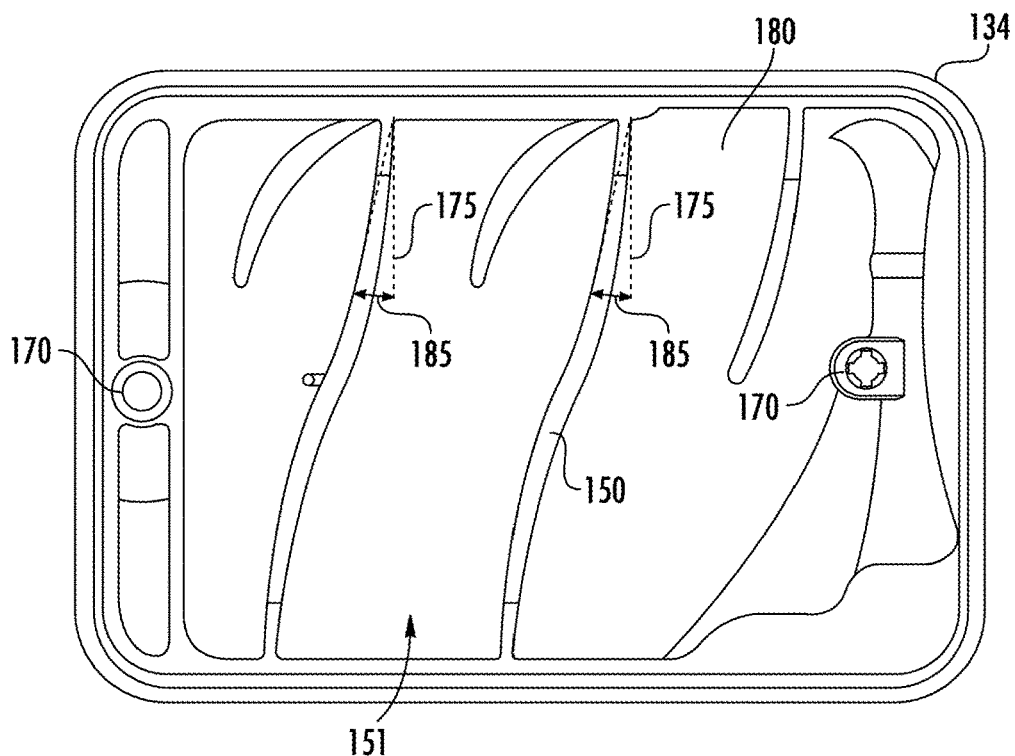
FIG. 10 is a bottom view of a cover of the air filter assembly of FIG. 3.
Figure 12:
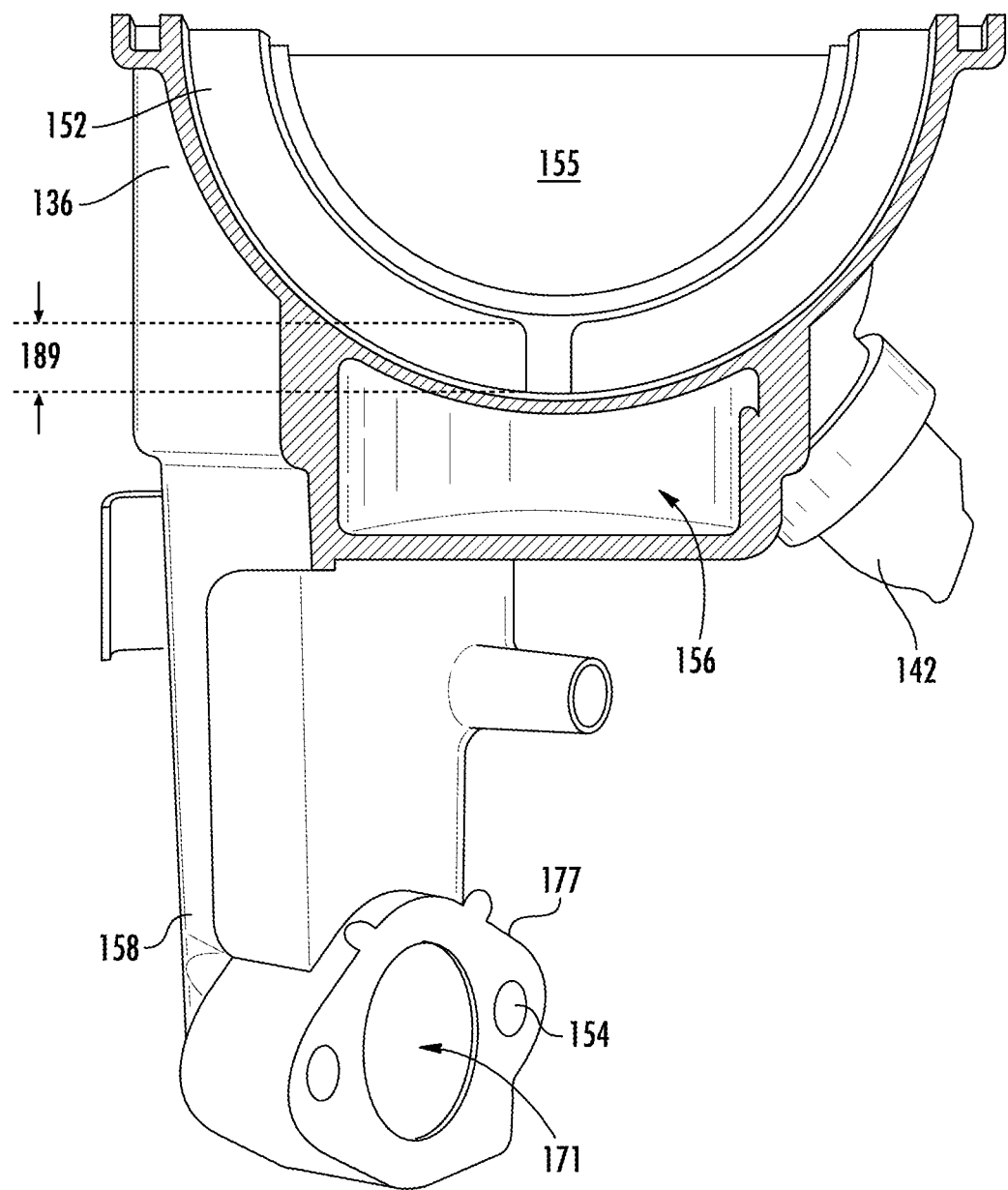
FIG. 12 is a sectional view of the base of the air filter assembly, taken along line 12-12 of FIG. 9.
Figure 13:
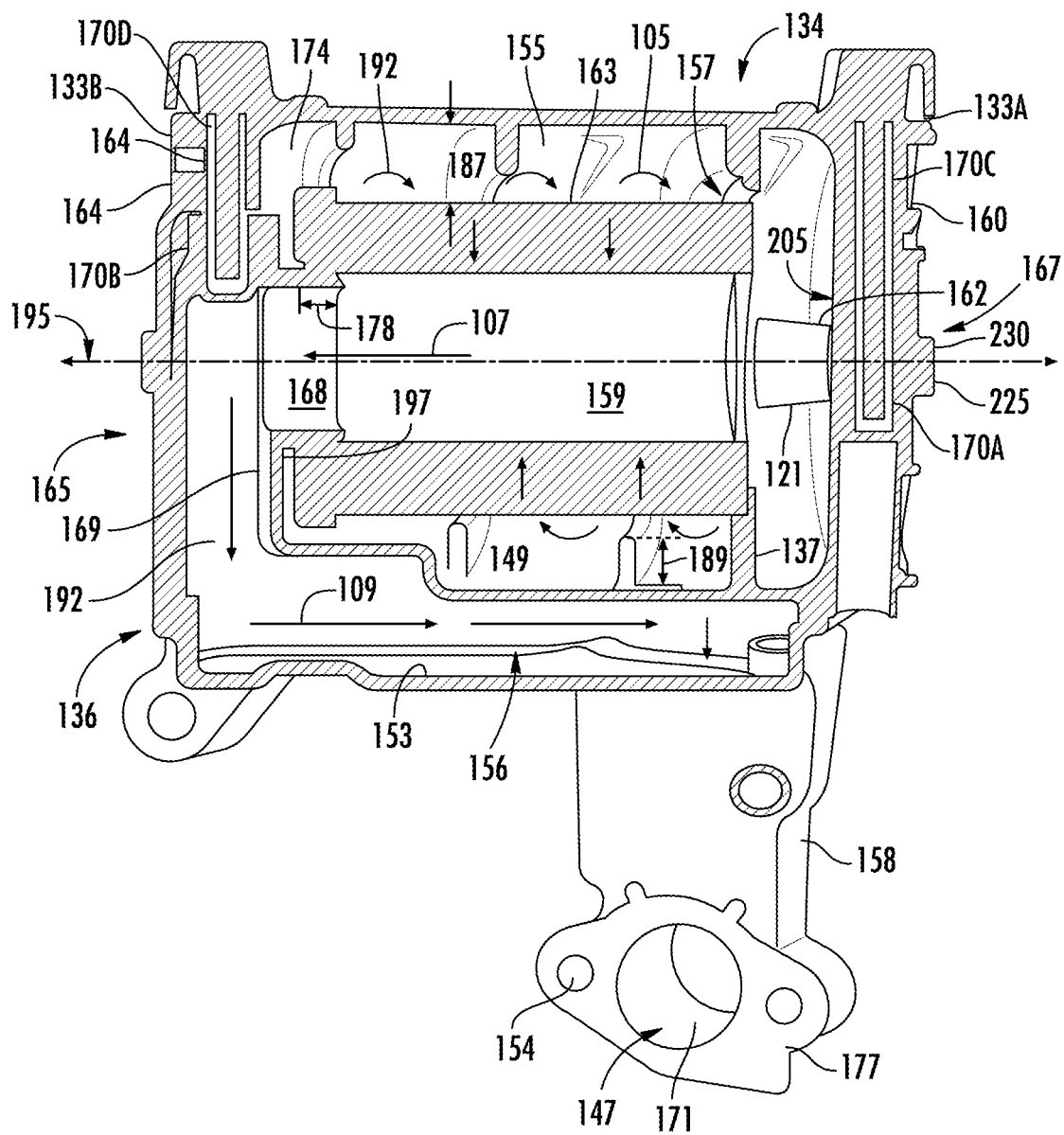
FIG. 13 is a sectional view of the air filter assembly, taken along line 13-13 of FIG. 4.
Figure 14:
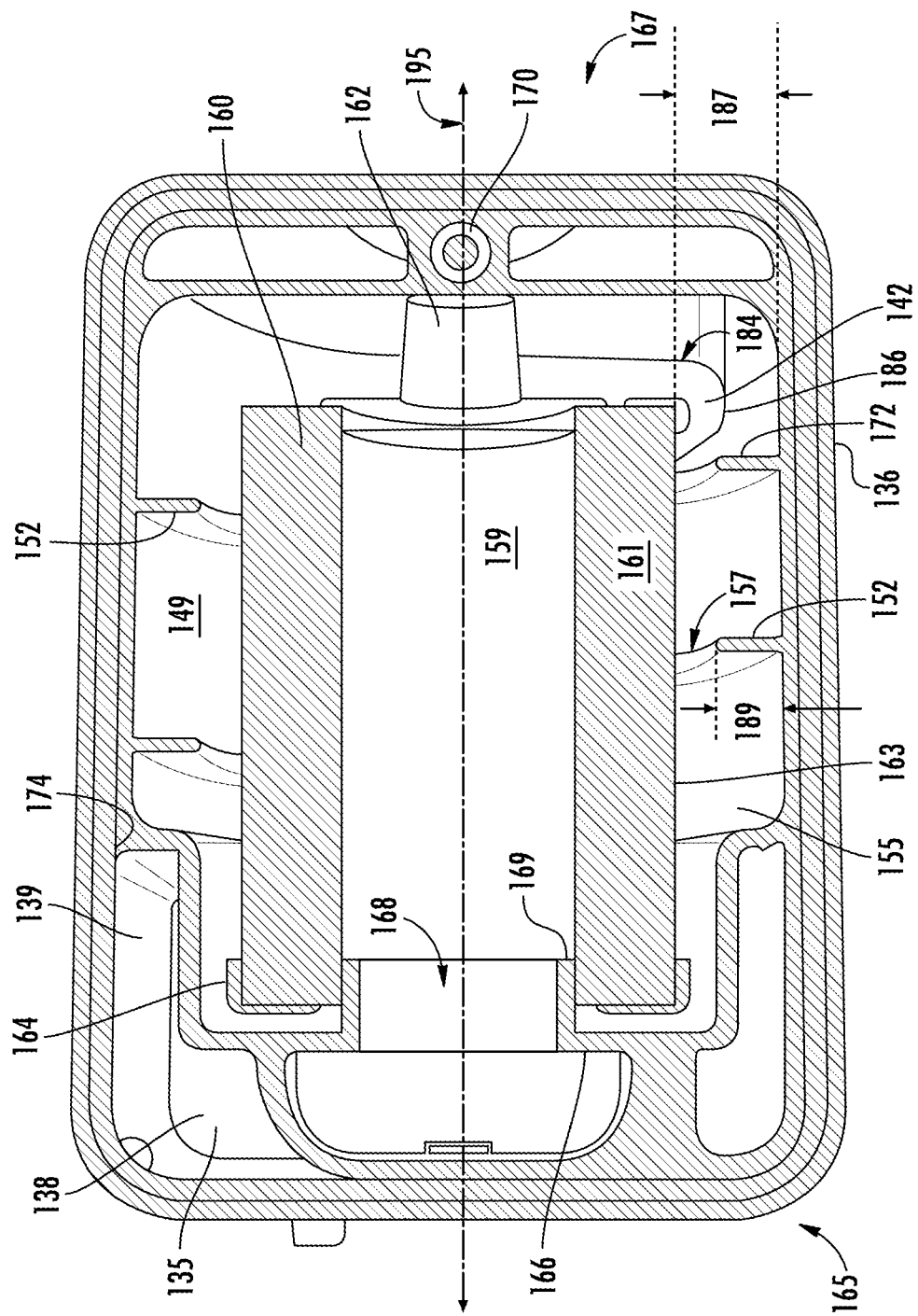
FIG. 14 is a sectional view of the air filter assembly, taken along line 14-14 of FIG. 11.

As shown in FIGS. 9-10, the interior surface 180 of the cover 134 and the interior surface 182 of the base 136 combine to form an interior volume 155 (shown in FIG. 6) of the air filter assembly 102, with the interior surface 180 of the cover 134 at least partially forming the interior volume 155 and the interior surface 182 of the base 136 also at least partially forming the interior volume 155. As shown in FIGS. 13-14, the filter element 160 divides the interior volume 155 into a non-filtered volume 149 and a filtered volume 159. The non-filtered volume 149 includes the space outside the filter element 160 and within the interior volume 155, and the filtered volume 159 includes the space inside the filter element 160. The cover 134 is designed to fasten and unfasten to the base 136 via aligned holes 170 (shown in FIGS. 9-10) formed in both the base 136 and cover 134. As shown in FIG. 12, the cover 134 includes fasteners 133 extending therethrough and configured to fit within the holes 170 to fasten the cover 134 to the base 136. The fasteners 133 are configured to rotate to lock and unlock the fastener 133 in and out of engagement with the holes 170 in the base 136. In other embodiments, other types of fasteners may be used (e.g., hinges, snaps, screws, etc.). Opening the cover 134 allows for insertion, removal, and checking of the status of the filter element 160 (shown in FIGS. 6-7) positioned within the interior volume 155 of the housing 132. In some embodiments, the cover 134 and base 136 are molded from a plastic material. In other embodiments, at least one of the cover 134 and base 136 is stamped or assembled from aluminum, another material, or is formed from a combination of materials and manufacturing processes.

Figure 8:
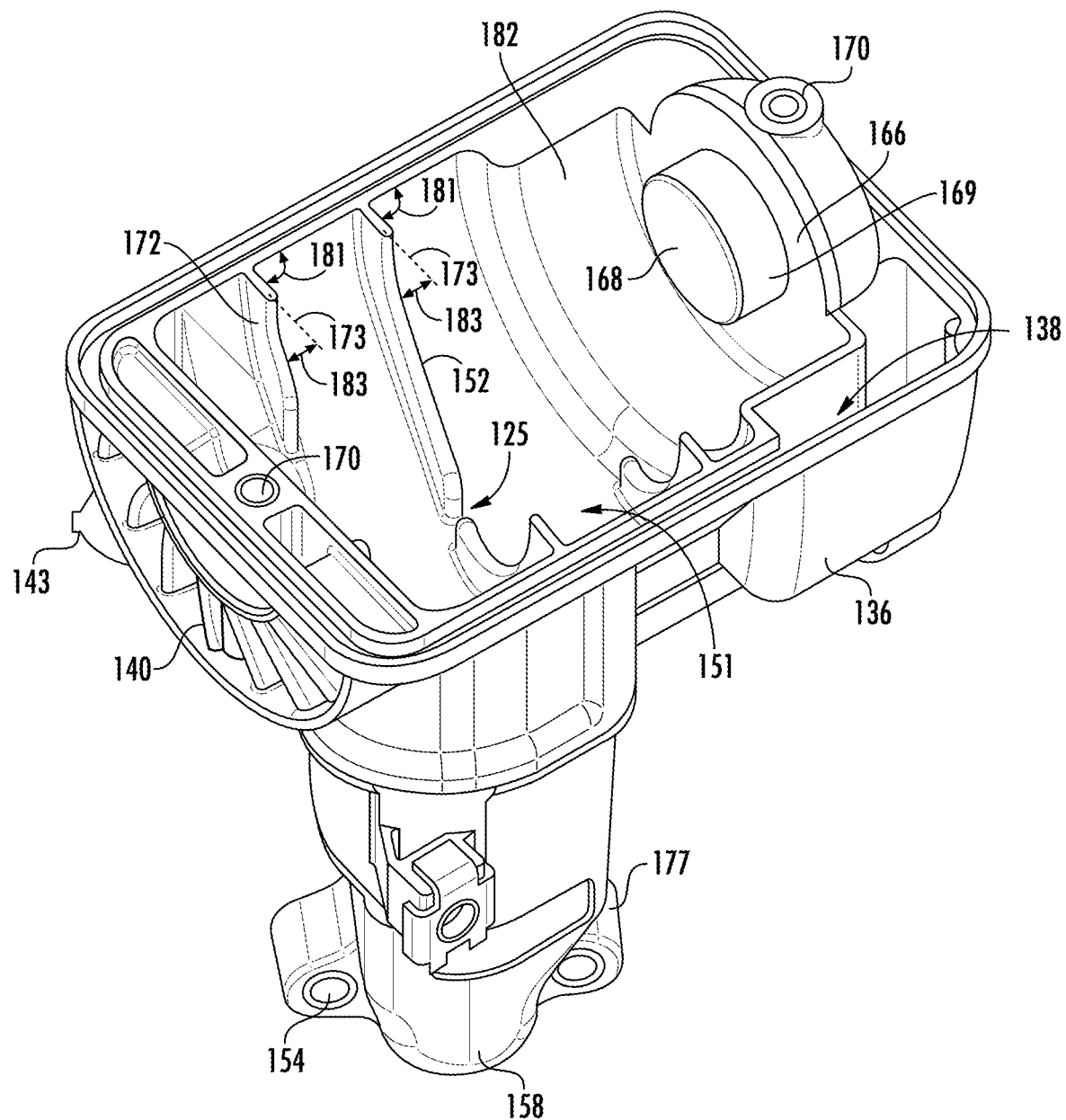
FIG. 8 is a top perspective view of the air filter assembly of FIG. 3 with the cover and filter removed.

The air filter assembly 102 includes an air intake 138, a debris outlet 142, and a filter outlet 168 formed in the base 136 of the air filter assembly 102. In other embodiments, the air intake 138, debris outlet 142, and filter outlet 168 can be formed elsewhere in the housing 132 (e.g., cover 134). As shown in FIGS. 8-9, the air intake 138 and debris outlet 142 are positioned on opposite sides and in opposite corners of the base 136. This relative positioning facilitates the cyclonic air filtering processes described herein. Additionally, as shown in FIGS. 8-9, the air intake 138 is positioned on the same side of the air filter assembly 102 as the filter outlet 168. This relative positioning helps to position the air filter assembly 102 closely to the other components of the engine 100, including the air-fuel mixing device 128. The air intake 138 is positioned near the exterior of the engine 100 to draw in relatively cool and clean air. If the air intake were positioned closer to the interior of the engine, the likelihood of drawing in relatively warm and/or dirty air would increase. The positioning of components (e.g., fuel tank 116, muffler 120) due to the horizontally oriented crankshaft 110 of the engine 100 is beneficial in combination with the horizontally oriented air filter assembly 102 (along with the relative placement of the air intake 138 and filter outlet 168) to keep the overall volume occupied by the engine 100 relatively compact. In other embodiments, the engine 100 may be vertically-shafted, while the air filter assembly 102 is horizontally oriented. As shown in FIG. 2, the air filter assembly 102 extends outward from the fuel tank 116 to a distance similar to the muffler 120. As shown in FIGS. 1-2, the combination of the air filter assembly 102 and the muffler 120 has an overall width similar to the width of the fuel tank 116. Positioning the filter outlet 168 on the same side of the air filter assembly 102 as the air intake 138 allows the air filter assembly 102 to fit within the overall footprint shared with the fuel tank 116 and the muffler 120 and be positioned directly above the air-fuel mixing device 128. This helps to keep the overall volume occupied by the engine 100 relatively compact. If the filter outlet was positioned at the end of the air filter assembly opposite the air intake, the resulting air filter assembly would likely extend outside of the footprint defined the fuel tank and the muffler and increase the overall volume occupied by the engine.

Figure 11:
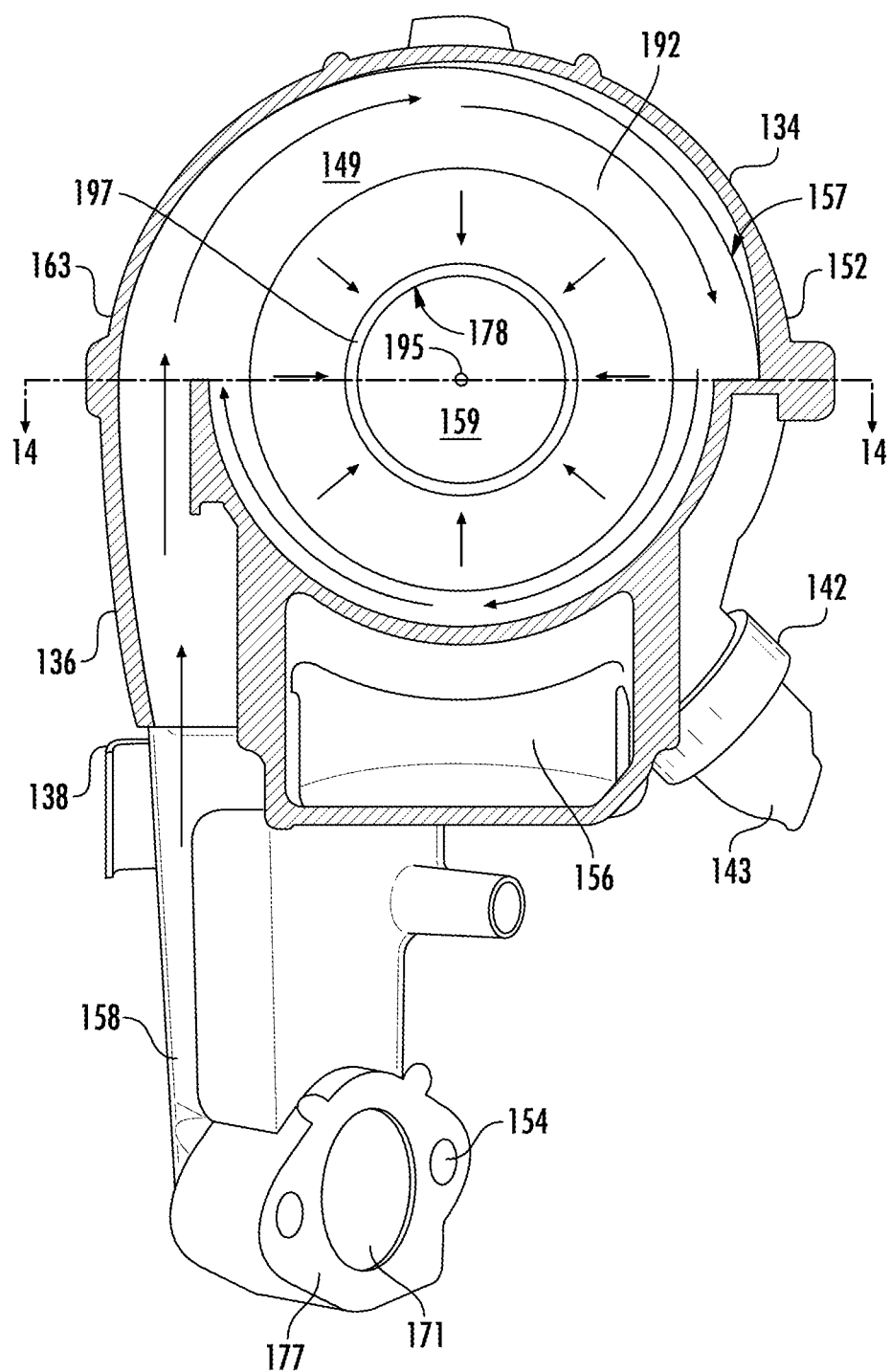
FIG. 11 is a sectional view of the air filter assembly, taken along line 11-11 of FIG. 3.

As shown in FIG. 11, the air intake 138 is formed within the base 136 of the housing 132 and is configured to direct air into the unfiltered volume 149 at an angle substantially tangential to a curved outer surface 163 of the filter element 160 to facilitate cyclonic filtering. In an exemplary embodiment, the air intake 138 extends from an outer surface of the base 136 to the interior surface 182 of the base 136 in a linear fashion such that the incoming air is not redirected upon entering the base 136. The air intake 138 has an L-shaped cross-section. The air intake 138 includes a first portion 135 and a second portion 139. The first portion 135 is larger in cross-sectional area than the second portion 139. Air flowing through the first portion 135 may complete substantially one cyclonic pass around the filter 160 before joining with the air flowing through the second portion 139, thereby entraining at least some of the air in the second portion 139 and facilitating the air flow through the second portion 139. Beneficially, this may increase the air flow velocity through the air intake 138. In some embodiments, the air intake 138 has a rectangular shaped cross-section. In some embodiments, the air intake 138 has a circular, oblong, square, or otherwise shaped cross-section. In an exemplary embodiment, the air intake 138 has a relatively small cross-sectional area so that a high incoming air flow velocity is maintained, while still allowing enough air to the engine 100 for combustion processes.

The debris outlet 142 includes a valve 143 (e.g., duckbill valve) that allows debris removed from the cyclonic air flow to exit the air filter assembly 102 and additionally prevents backflow of the air and debris into the air filter assembly 102. The valve 143 opens and closes with changes in the pressure of the interior volume 155. During periods of relatively low differential pressure (e.g., the difference in pressure between the interior volume 155 and the outside pressure) when a vacuum may exist within the interior volume 155, the valve 143 closes and during periods of relatively high internal differential pressure, the valve 143 opens. As such, changes in the internal pressure during operation of the engine 100 (e.g., due to intake pressure pulses at the air intake conduit 126 caused by reciprocation of the piston) opens and closes the valve 143. Additionally, due to the pressure differences, incoming air is drawn into the air filter assembly 102 at a relatively high velocity and is directed toward the debris outlet 142, where it slows due to a relatively open space 184 (e.g., and lower pressure) around the debris outlet 142. Larger debris is directed into or near the debris outlet 142 due to the decreased velocity of the air at the debris outlet 142. A trough 186 (e.g., depressed pocket) is formed near the debris outlet 142 in the interior surface 182 of the base 136. The trough 186 facilitates funneling or channeling debris toward the debris outlet 142. Additionally, as described below, a last rib 172 is positioned next to the trough 186 and the debris outlet 142 to prevent debris blowback from the trough 186. For example, debris may accumulate in the trough 186 when the engine 100 is stopped and air stops flowing through the air filter assembly 102. When the engine 100 is restarted, air begins to flow through the air filter assembly 102 again and may disturb and re-entrain debris collected in the trough 186. The placement of the last rib 172 next to the trough 186 helps to prevent re-entrainment of collected debris so that the collected debris instead exits the air filter assembly 102 through the debris outlet 142. The trough 186 is discussed further below with reference to FIG. 20.

Figure 15:
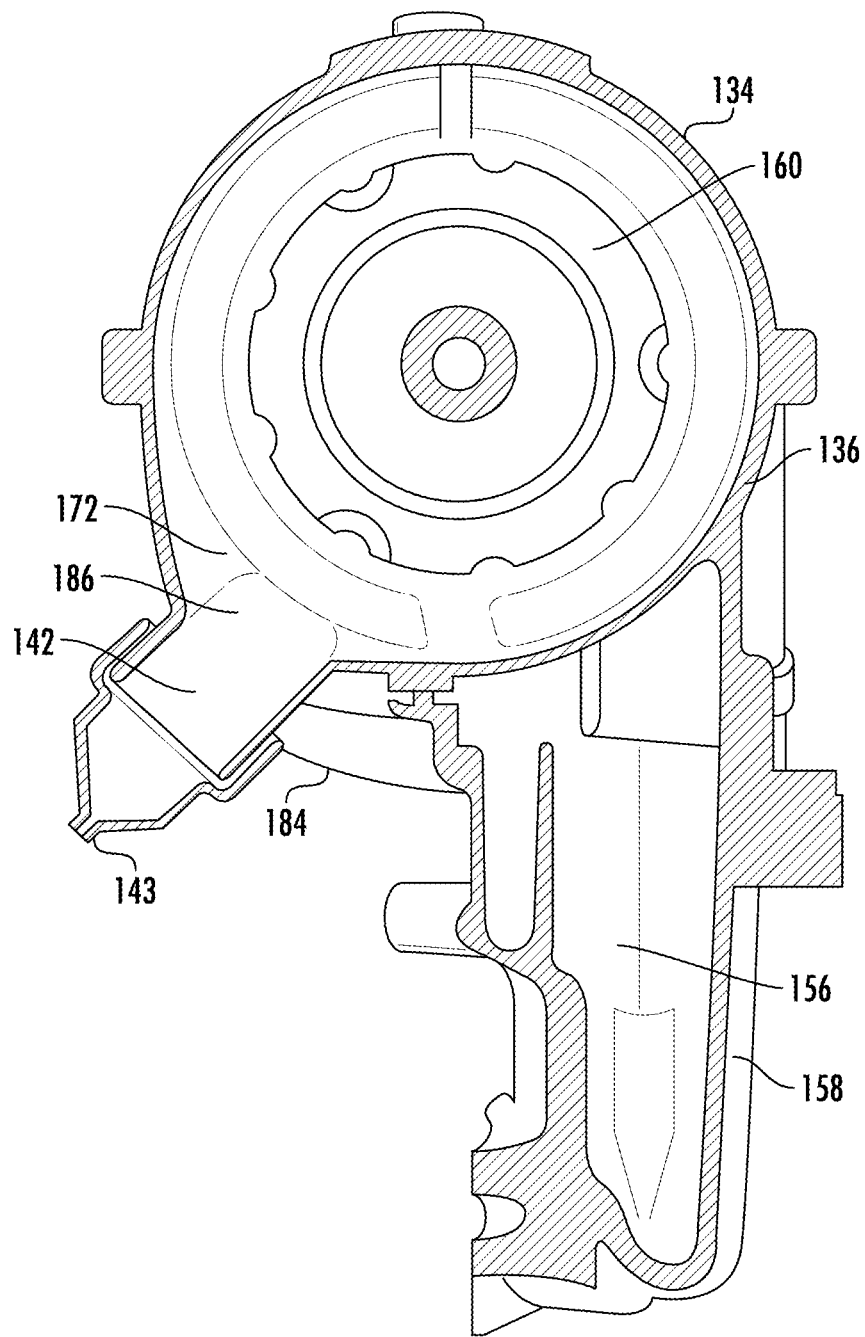
FIG. 15 is a sectional view of the air filter assembly, taken along line 15-15 of FIG. 4.
Figure 16:
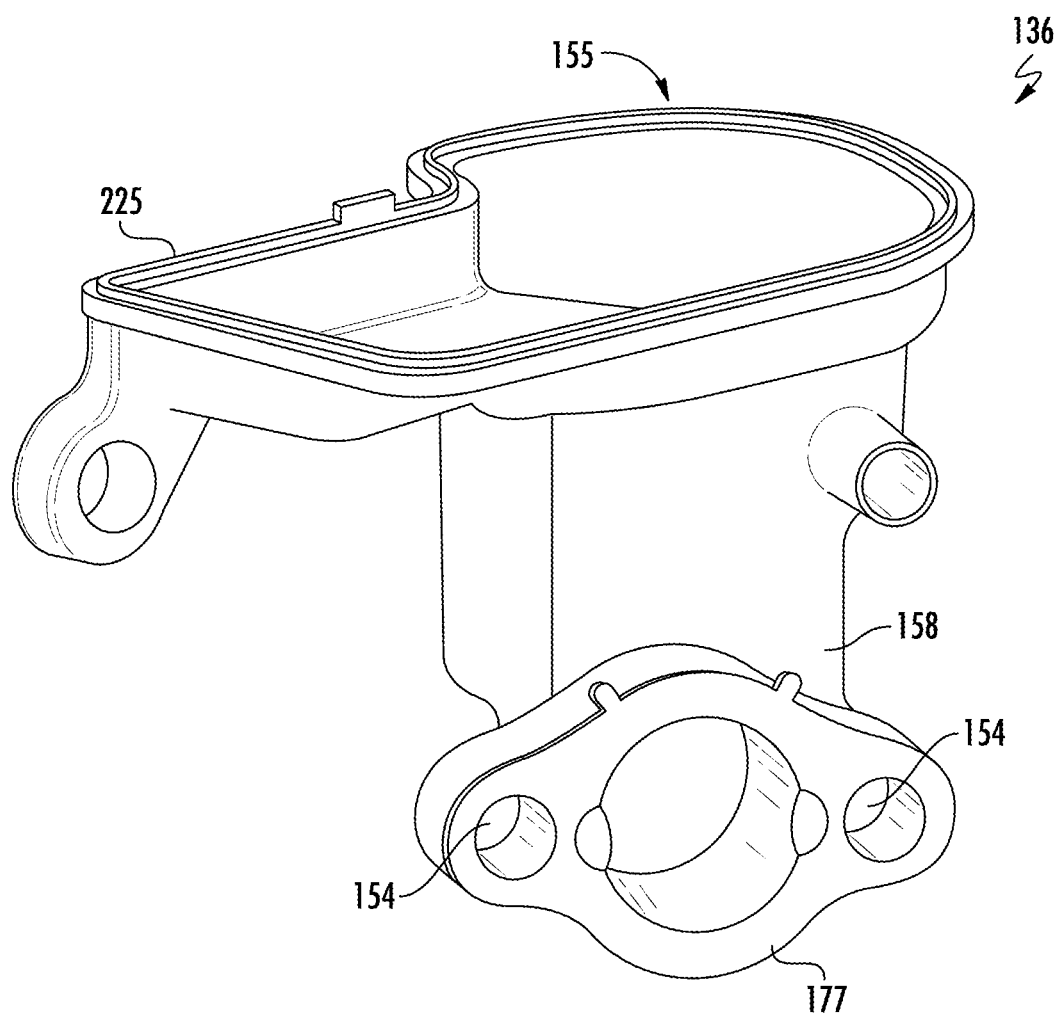
FIG. 16 is a perspective view of a base of an air filter assembly, according to an exemplary embodiment.

As shown in FIGS. 9 and 15, the debris outlet 142 is positioned in the base 136 in an opposite corner from the air intake 138. Air moving from the air intake 138 is cyclonically filtered around the filter element 160 and is directed toward the space 184 located near the end 162 of the filter element 160 where the air flow slows, allowing the debris to exit the air flow and be drawn downward by gravity toward the debris outlet 142. As such, debris in the incoming air is directed toward the debris outlet 142 instead of accumulating elsewhere within the base 136. Without the debris outlet 142 positioned near the space 184 near the end 162 of the filter element 160, debris may remain suspended in the air flow. An opening 125 (FIGS. 8-9) in the ribs 152 in the base 136 allows any debris that may remain within the base 136 to move through the housing 132 toward the debris outlet 142. Further, the debris outlet 142 is angled away (e.g., at approximately a 45 degree interior angle from a vertical plane that includes the longitudinal axis 145 of the filter element 160 when installed in the base 136) from the housing 132. The debris outlet 142 is positioned to direct debris exiting the air filter assembly 102 away from a spark plug of the engine 100 such that debris does not accumulate on the spark plug.

Figure 7:
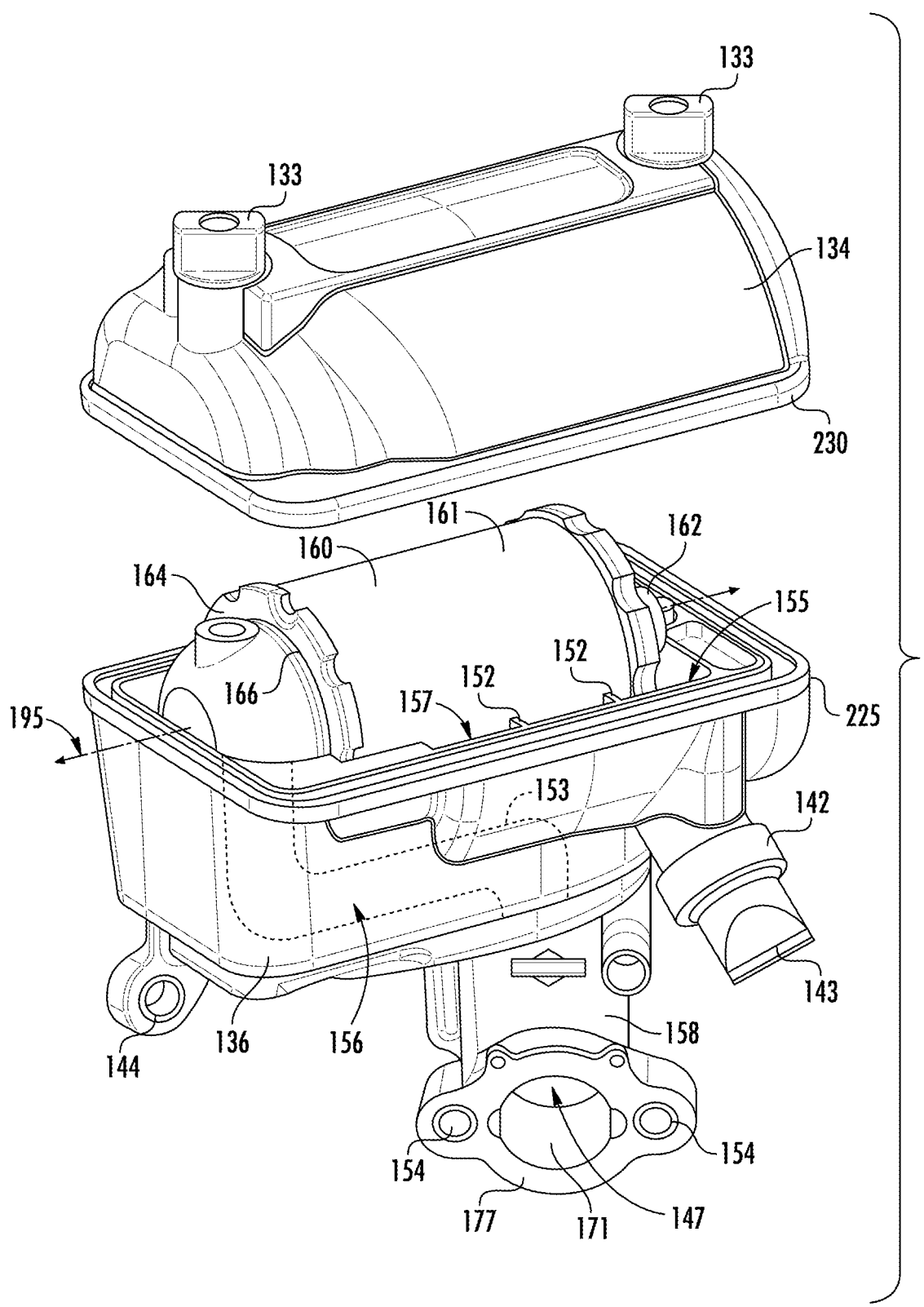
FIG. 7 is a rear perspective view of the air filter assembly of FIG. 3 with the cover removed.

The filter outlet 168 is formed within the base 136 of the housing 132 and is configured to direct filtered air into an intake conduit 126 of the engine 100. The filter outlet 168 is positioned within and in fluid communication with the filtered volume 159 of the filter element 160. The filter outlet 168 is circular in cross-section. In other embodiments, the filter outlet 168 can be oblong, square, rectangular, or otherwise shaped in cross-section. As shown in FIGS. 7 and 13, an outlet conduit 156 (e.g., passage) includes a first passage 153 that is formed in the base 136 of the housing and a second passage 147 formed in a neck or elbow 158 that includes the mounting flange 177 for securing the housing 132 to the air-fuel mixing device 128 of the engine 100 (e.g., via bolts or other fasteners inserted through the bolt holes 154 of the mounting flange 177). The first passage 153 of the outlet conduit 156 is located below the interior volume 155. This arrangement helps to provide a relatively compact air filter assembly 102 that can provide both a cyclonic filtering stage and a filter media filtering stage and route the air filtered by both filtering stages to the air-fuel mixing device 128 by allowing the air filter stages and the routing of the filter air in the first passage to occur within the same overall footprint but at different elevations within the air filter assembly 102.

In some embodiments, the base 136 and the elbow 158 are formed as separate components and fastened together (e.g., by ultrasonic welding). In other embodiments, the base 136 and the elbow 158 are integrally formed as a single piece (e.g., a single plastic molded part). The outlet conduit 156 extends between the filter outlet 168 and a final outlet 171 formed on the mounting flange 177 of the elbow 158. The final outlet 171 is formed within the mounting flange 177 of the elbow 158 and is in fluid communication with the outlet conduit 156 and the intake conduit 126 of the engine 100. The final outlet 171 is circular in cross-section. In other embodiments, the final outlet 171 can be oblong, square, rectangular, or otherwise shaped in cross-section. The outlet conduit 156 is fluidly coupled by way of the intake conduit 126 to the air-fuel mixing device 128. The intake conduit 126 is directly coupled to the air-fuel mixing device 128. The intake conduit 126 may be separate or may be at least partially integrated with the engine block or cylinder head, and may be formed from metal, plastic, or other materials. The air filter assembly 102 is positioned directly above the air-fuel mixing device 128 of the engine 100 to allow the intake conduit 126 to be directly coupled to the air-fuel mixing device 128 and to eliminate any need for an intermediate conduit or hose connecting the air filter assembly 102 to the air-fuel mixing device 128.

A gap 157 is formed between the interior surfaces 180, 182 of the cover 134 and base 136, respectively, and the curved outer surface 163 of the filter element 160. As shown by airflow path 192 in FIG. 13, the gap 157 is configured to facilitate cyclonic filtering by directing the incoming air flow around the filter element 160 within the interior volume 155 of the housing 132. The gap 157 includes a gap distance 187 between the interior surfaces 180, 182 and the curved outer surface 163 of the filter element. The gap distance 187 is sized such that an incoming air flow velocity is maintained, without impeding air flow due to the proximity of the filter element 160 relative to the interior surfaces 180, 182 of the cover 134 and base 136.

Referring now to FIGS. 12-14, the cover 134 and base 136 each include ribs 150, 152 (e.g., angled protrusions) extending axially inward from the interior surfaces 180, 182 of the cover 134 and base 136, respectively. The ribs 150, 152 are configured to facilitate a cyclonic filtering effect within the housing 132 of the air filter assembly 102. As such, the ribs 150, 152 direct incoming air to follow the contour of the gap 157 between the curved outer surface 163 of the filter element 160 and the interior surfaces 180, 182 of the cover 134 and base 136, respectively. In an exemplary embodiment, a last rib 172 is positioned near the trough 186 and the debris outlet 142 to prevent debris blowback from the trough 186 and the debris outlet 142. The ribs 150, 152 extend in toward a longitudinal center axis 195 of the air filter assembly 102 by a distance 189. The longitudinal center axis 195 is located in the center of the interior volume 155. In some embodiments, the longitudinal center axis 195 is included in a horizontal plane that defines a parting line between the cover 134 and the base 136 (e.g., the interface between the mounting flanges 225 and 230 of the base 136 and the cover 134). The distance 189 is more than half of the gap distance 187 between the interior surfaces 180, 182 and the outermost surface 163 of the filter media 161. The filter media 161 may be pleated paper such that the outermost surface 163 is formed by a series of pleats or folds. The outermost surface 163 of the pleated paper filter media 161 defines a generally circular cross-sectional shape. The ribs 150, 152 are of the same height around the circumference of the interior surfaces 180, 182 of the housing 132. In an exemplary embodiment, the ribs 150 in the cover 134 align with the ribs 152 in the base 136 to form one or more angled air channels 151 within the housing 132. The alignment of the ribs 150, 152 aids in directing the air flow to create the cyclonic filtering effect (e.g., helical flow) within the housing 132. In some embodiments, the ribs 150, 152 are helical (i.e., helical ribs) to help induce the cyclonic filtering effect. The dimensions of the ribs 150, 152 are formed so as to facilitate desired air flow through the angled air channels 151 for the filtering process. The rib height (e.g., distance 189) being greater than half of the gap distance 187 helps to maintain relatively high air flow velocity throughout the cyclonic filtering stage. Maintaining the relatively high air flow velocity aids in discharging debris near the debris outlet 142. In some embodiments, the ribs 150, 152 extend to a rib height (distance 189) that brings the ribs 150, 152 into contact with the outermost surface 163 of the filter media 161, thereby forming closed channels in which the cyclonic air flow travels until the final channel which deposits debris toward the trough 186. Applicant believes that relatively short rib heights (e.g., 25% or less of the gap distance 187) allows too much of the air flow to short circuit across the cyclonic channels formed by the ribs 150, 152 and reduces the efficiency on the cyclonic filtering operation. As shown in FIG. 13, a first air channel 174 is narrower in width than the other air channels 151. The narrow width of the first air channel 174 restricts the air flow through the first air channel 174 and increases the air flow velocity of the air flowing in from the air inlet 138. Ensuring a relatively high air flow velocity at the start of the cyclonic filtering process near the end 164 of the air filter element 160 helps to maintain a relatively high air flow velocity throughout the cyclonic filtering process.

As shown in FIGS. 8-10, the ribs 150, 152 are axially arranged such that the desired air flow exit velocity is maintained (e.g., 30 feet per second debris outlet target velocity). Referring to FIG. 8, the ribs 150, 152 are arranged at an angle 181 relative to the interior surfaces 180, 182 of the cover 134 and base 136, respectively, and at an angle 183 relative to horizontal plane 173. As shown in FIG. 10, the ribs 150, 152 are further arranged at an angle 185 relative to vertical plane 175. The arrangement of the ribs 150, 152 at angles 181, 183, 185 allow for a target air flow exit velocity to be maintained, with minimal drag on the incoming air. In some arrangements, the placement, angle, and dimensions of the ribs 150, 152 are configured using a screw-pitch type measurement, such as designating a set number of ribs over a length of the air filter assembly 102.

Figure 5:
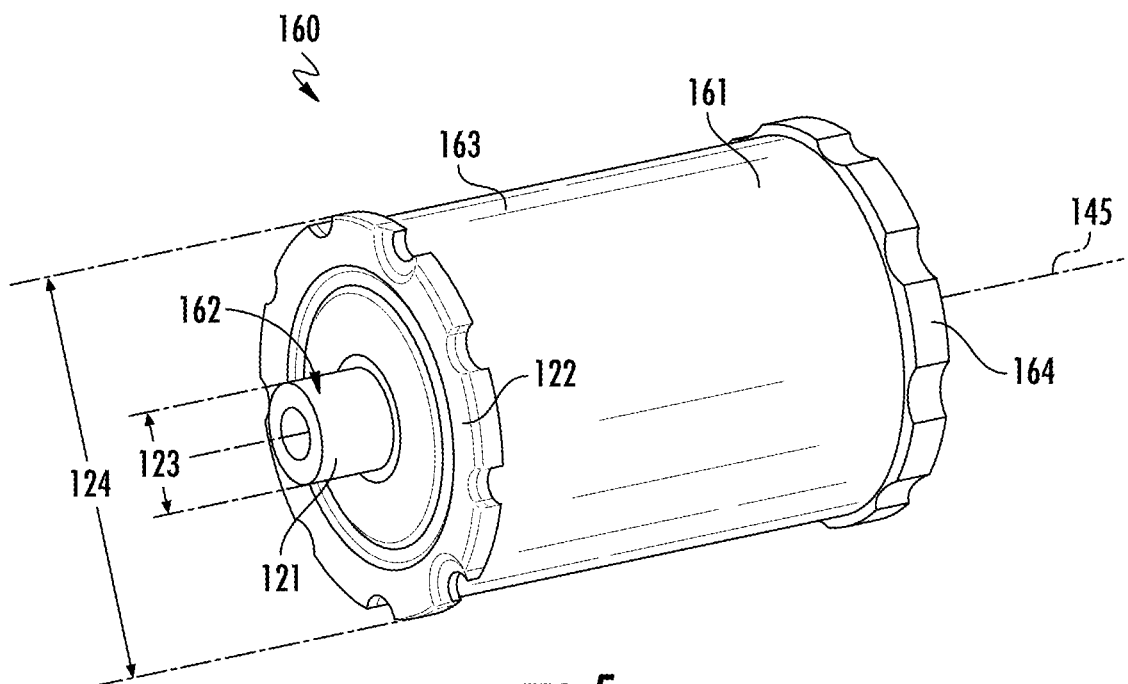
FIG. 5 is a front perspective view of a filter element of the air filter assembly, according to an exemplary embodiment.
Figure 5A:
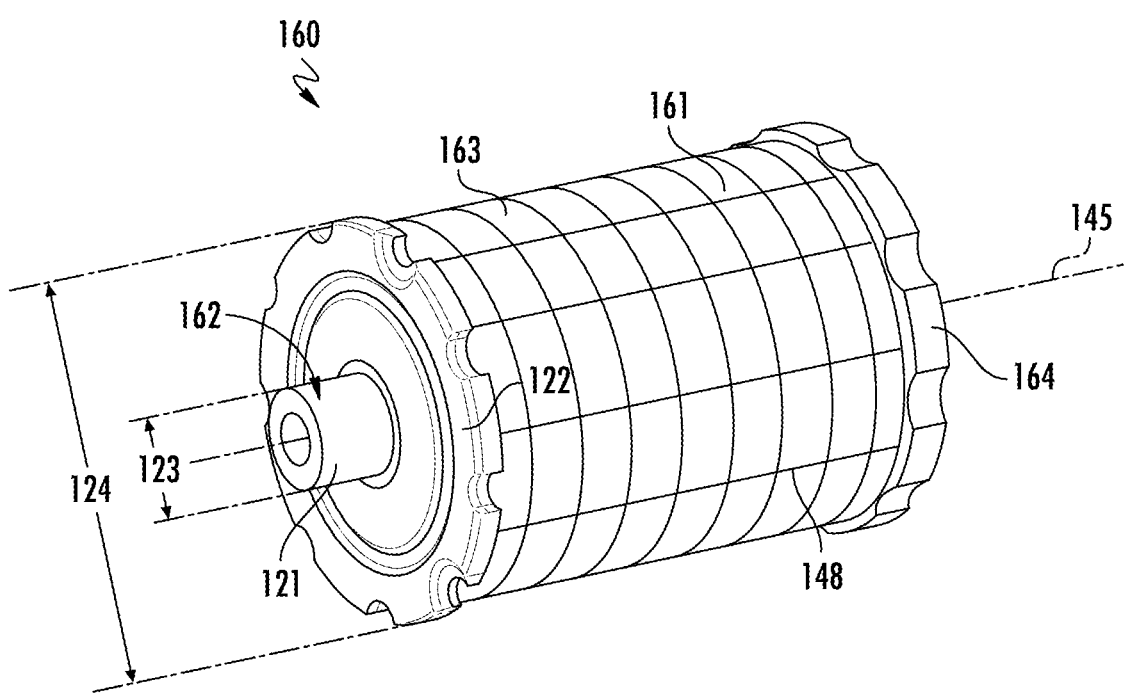
FIG. 5A is a front perspective view of a filter element of the air filter assembly, according to an exemplary embodiment.
Figure 5B:
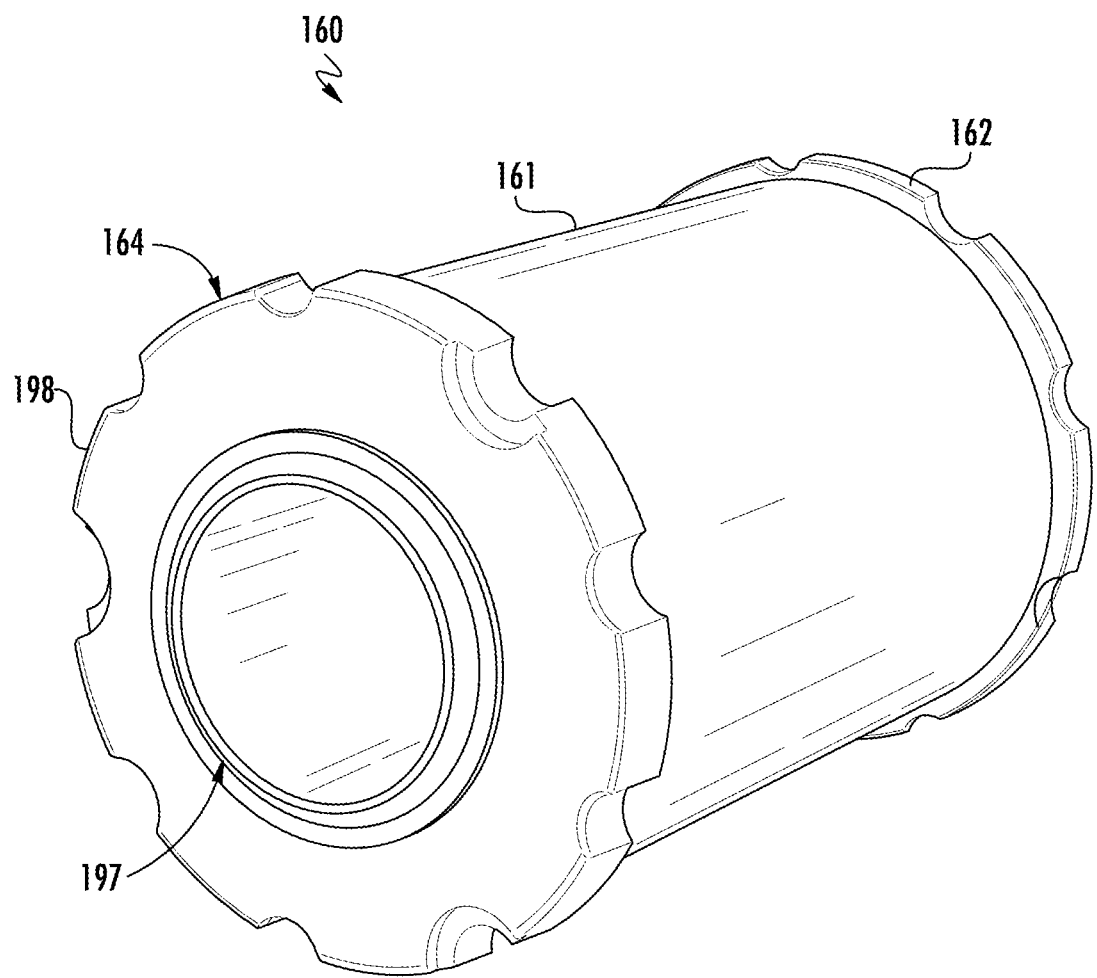
FIG. 5B is a rear perspective view of the filter element of FIG. 5.
Figure 6:
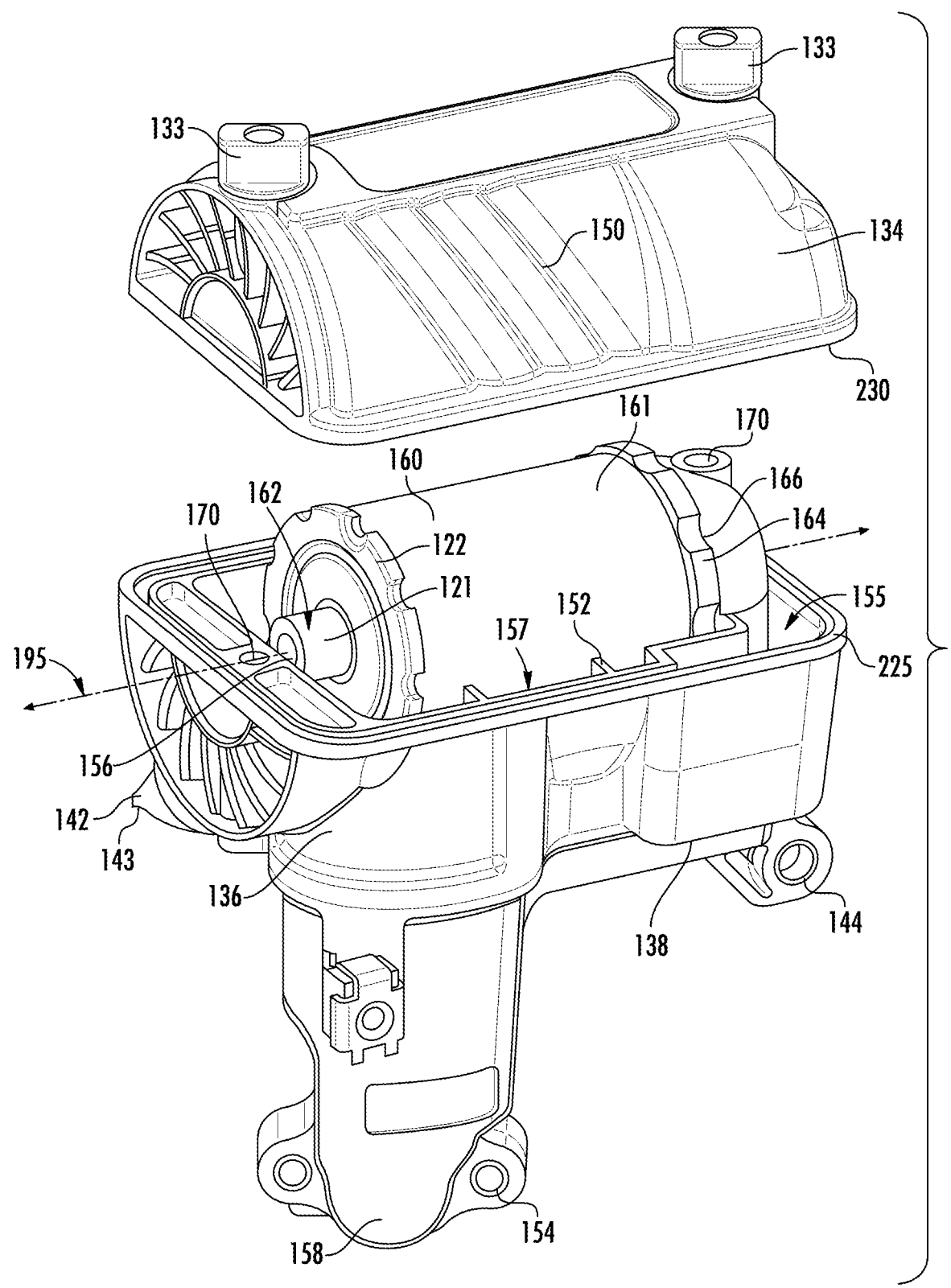
FIG. 6 is a perspective view of the air filter assembly of FIG. 3 with the cover removed.

Referring to FIGS. 5-7, the filter element 160 is positioned within the interior volume 155 (e.g., coupled to the base 136). The filter element 160 includes an open or unsealed end or end portion 164 (FIG. 5B) and a closed or sealed end or end portion 162 (FIG. 5) with filter media 161 extending between the ends 162, 164. According to an exemplary embodiment, the filter media 161 and ends 162, 164 combine to define a filtered volume, with the filter media 161 defining at least a portion of the filtered volume and the ends 162, 164 defining at least a portion of the filtered volume. In some such embodiments, the filter media 161 is structured such that the filter media 161 has a closed-loop, such as the periphery of a circle, ellipse, rectangle, or other closed-loop shape.

Referring to FIGS. 5-5B, the filter media 161 may be formed from different materials suitable for filtering debris from the intake air provided for combustion by the engine 100 by being permeable to air but largely preventing the ingress of dust and other contaminants from the unfiltered side to the filtered side. In some embodiments, the filter media 161 is pleated filter paper. In some embodiments, the filter media 161 is a cellulose filter media. In other embodiments, and as described further herein, the filter media 161 includes a debris-shedding filter material. In some embodiments, such debris-shedding media is a nanomedia and includes multiple layers of cellulose media. In an exemplary embodiment, the filter element 160 is substantially cylindrical in shape so as to facilitate the cyclonic filtering of incoming air prior to filtering by the filter media 161 by providing a curved outer surface 163 for the air to flow around during cyclonic filtering (i.e., the filter element 160 is symmetrical about a longitudinal center axis 145). In embodiments including a pleated filter media 161, the outermost surface 163 of the pleated filter media 161 defines a generally circular cross-sectional shape and is considered to create a cylinder shaped filter element 160.

In some embodiments, the ends 162, 164 are formed from a rigid material, such as plastic, cardboard, composite, aluminum, or other materials. In some embodiments, the end 162 is formed from a harder material than the end 164 (i.e., the end 162 has a greater durometer than the end 164). For example, the end 162 may be formed from a hard urethane foam having a relatively high durometer (e.g., a Type 3 urethane foam) and the end 164 may be formed from a soft urethane foam have a relatively low durometer (e.g., a Type 2 urethane foam). The end 162 formed from the harder material includes a standoff, projection, or boss 121 that extends outward from a main portion or body 122 of the end 162 (i.e., away from the filter media 161). The boss 121 is centrally located on the body 122 (i.e., the outer diameter 123 of the boss 121 and the outer diameter 124 of the body 122 are both centered at the longitudinal center axis 145 of the filter element 160). The outer diameter 123 of the boss 121 is less than the outer diameter 124 of the body 122. The end 164 formed from the softer material includes an opening 197 formed through the body 198 of the end 164 that allows filtered air from within the filter media 161 to exit the filter element 160. The softer material helps to form a seal between the end 164 and the conduit or duct (e.g., filtered air passageway) to which the filter element 160 is attached.

In some embodiments, the filter media 161 is made from a debris-shedding media. In such a case, the filter media 161 is configured to shed debris due to vibration. The debris-shedding media is constructed so that vibrations within a particular or predetermined frequency range cause debris to fall off of the filter material. In some embodiments, during warm-up of an engine from a stopped condition to idle speeds of the engine 100 (e.g., 3600 revolutions per minute (RPM)), the engine 100 vibrates in the frequency range of 10 Hz to 30 Hz. This vibration of the engine causes debris to fall off of the filter media 161. The debris shed from the filter media 161 can be carried by the cyclonic air flow through the housing 132 and directed out of the valve 143 of the debris outlet 142.

As shown in FIG. 5A, in some embodiments, the filter element 160 includes a guard or shield 148 that protects the filter media 161 from impacts. As shown in FIG. 5A, the guard 148 is an expanded metal cage that surrounds the filter media 161. When the filter element 160 becomes clogged with debris, a user may remove the filter element 160 and shake it to remove the accumulated debris. In certain instances, the user may strike a solid object with the filter element 160 to help knock the accumulated debris off of the filter media 161. The guard 148 protects the filter media 161 from damage that could otherwise be caused by such an impact.

Figure 20:
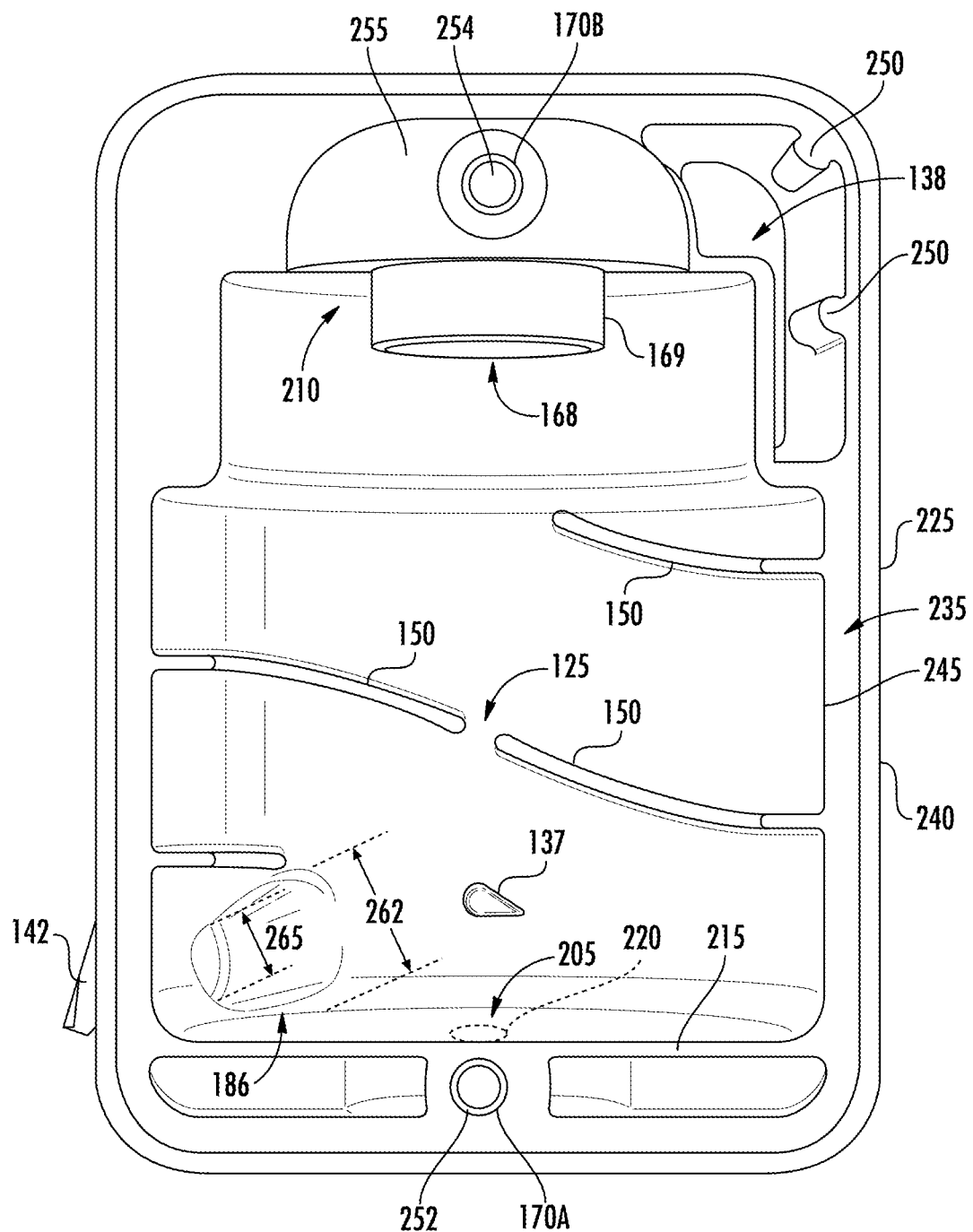
FIG. 20 is a top view of the base of FIG. 16.
Figure 21:
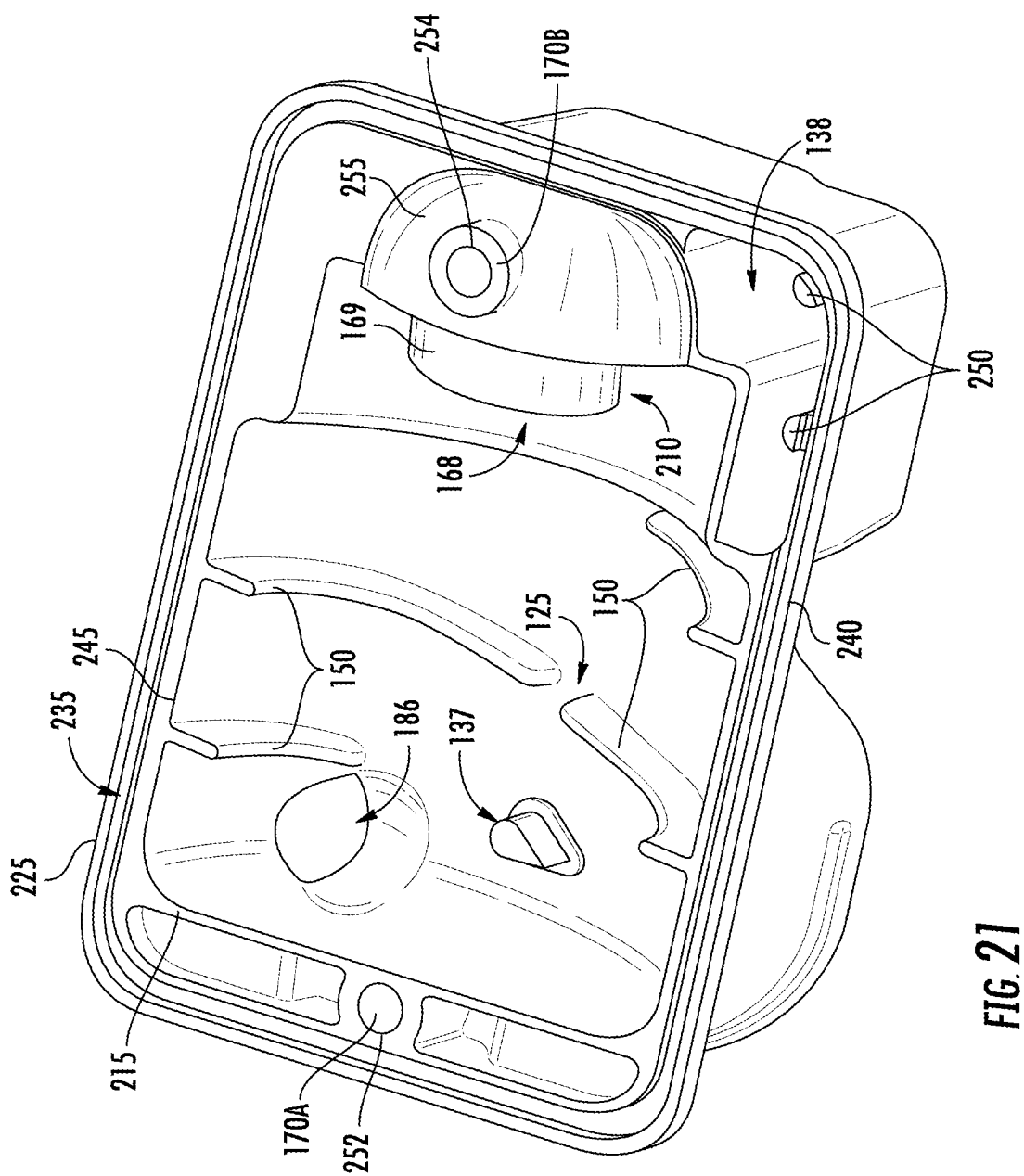
FIG. 21 is a perspective view of the base of FIG. 16.
Figure 22:
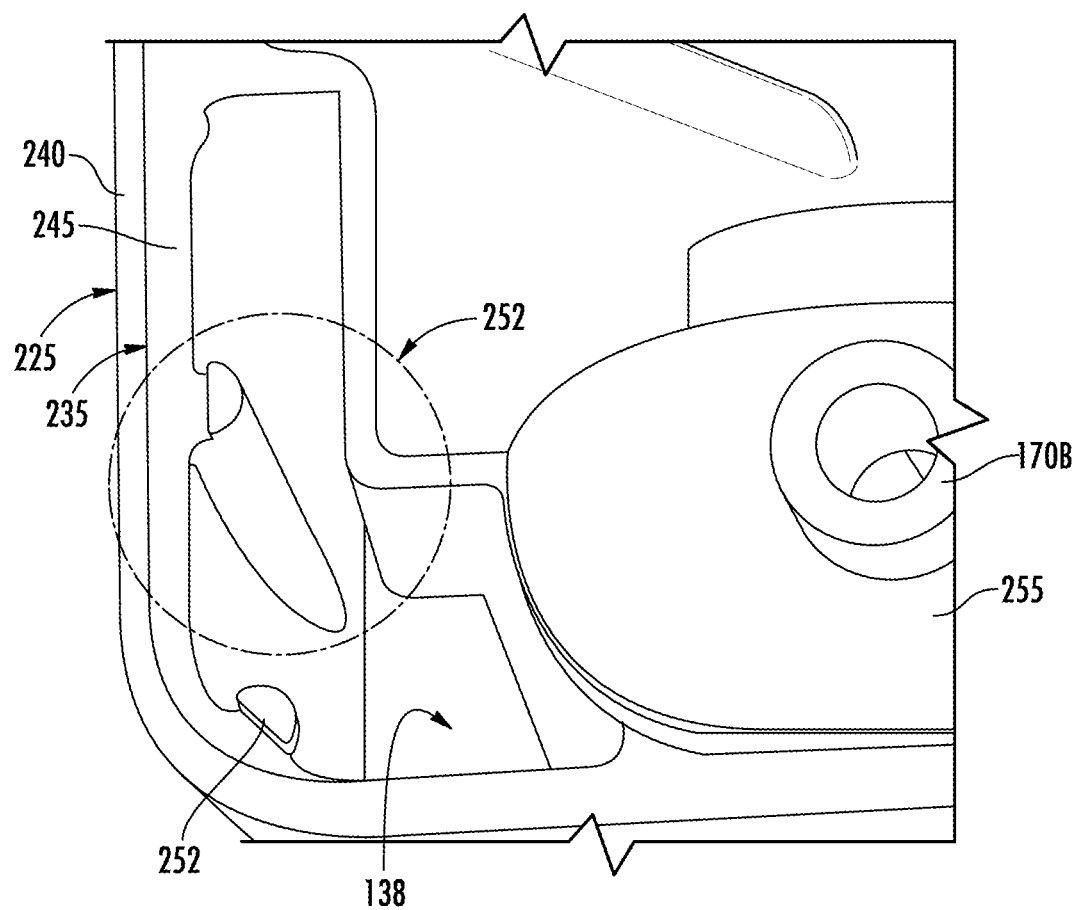
FIG. 22 is a detail view of the base of FIG. 16.

As shown in FIGS. 13-14, the opening 197 has the same size and shape as a protrusion or boss 169 of an air filter conduit or duct 156 that surrounds the filter outlet 168. The opening 197 receives the boss 169 surrounding the filter outlet 168 to support the filter element 160 on the boss 169 and create a seal 178 between the end 164 and the boss 169 to prevent filtered air from reentering the interior volume 155 from within the filter element 160. As shown in FIG. 13, the seal 178 extends longitudinally for a distance of contact between the end 164 of the filter element 160 and the boss 169 and, as shown in FIG. 11, circumferentially around the area of contact between the end 164 of the filter element 160 and the boss 169. The filter element 160 may additionally be supported within the base 136 by a protrusion 137. The protrusion 137 may support the weight of the filter element 160 at an outer surface 163 of the end 162. The protrusion 137 may be an annular ring shape so as to be of a similar shape as the outer surface 163 of the filter element 160. In some embodiments, as shown in FIGS. 20-21, the protrusion 137 is an air foil shape so as to both support the filter element 160 and direct the cyclonic air flow toward the space 184 and debris outlet 142. In other embodiments, the filter element 160 is only supported by the engagement between the end 164 and the boss 169 surrounding the filter outlet 168. In an exemplary embodiment, the end 162 is positioned proximate the debris outlet 142 and the end 164 is positioned proximate the air inlet 138. As shown in FIGS. 13-14, the filter element 160 is horizontally positioned within the housing 132 to align the longitudinal center axis 145 of the filter element 160 with the longitudinal center axis 195 of the base 136 of the air filter assembly 102. The boss 169 surrounding the filter outlet 168 is similarly horizontally oriented with boss 169 extending horizontally outward from the surface 166 along the center axis 195. When the filter element 160 is removed from the housing 132, the boss 169 shields the filter outlet 168 from a direct path for any debris falling off of the filter element 160. In some embodiments, the boss 169 has a length of 0.5 inches or more. The horizontal arrangement of the filter element 160 and the boss 169 means debris from the filter element 160 is less likely to fall off and enter the filter outlet 168 as compared to a vertically positioned filter and boss, in which any debris falling off of the filter element would have a clear path to the outlet.

In operation, outside air flows into the air intake 138 of the air filter assembly 102. The air intake 138 is positioned such that incoming air enters the housing 132 tangentially to the filter element 160 and naturally flows into the cyclonic airflow path 192 established within the gap 157. The incoming air is not redirected during passage through the air intake 138. In an exemplary embodiment, the incoming air is not forced into the housing 132 using a fan, and instead air is drawn into the housing 132 using pressure pulses created from the reciprocation of the piston during operation of the engine 100. Outside air moves past the air intake 138 and whatever air enters the air intake 138 naturally flows from the air intake 138 into the unfiltered volume 149 of the housing 132 and toward the debris outlet 142.

Once inside the housing 132, the incoming air is cyclonically filtered prior to being filtered by the filter element 160. The air flows around the filter element 160 in the gap 157 formed between the outer surface 163 of the filter element 160 and the interior surfaces 180, 182 of the cover 134 and base 136. During cyclonic filtration, large particles are filtered from the incoming air and directed toward the debris outlet 142. The incoming air completes at least two turns or cyclonic passes around the filter element 160 within the gap 157 prior to being filtered by the filter element 160. Partially filtered air then flows through the filter media 161 of the filter element 160 where smaller particles of debris are filtered out of the air. The filtered air flows into the filter outlet 168, through outlet conduit 156, through the final outlet 171 and into the intake conduit 126 of the engine 100. As shown in FIGS. 13-14, the filter outlet 168 is in fluid communication with the filtered volume 159 and is sealed against the end 164 of the filter element 160 such that only filtered air is directed to the engine 100.

Referring to FIG. 13, the air filter assembly 102 includes a first end portion 165 and a second end portion 167. End 164 of the filter element 160 is positioned proximate the first end portion 165 and end 162 of the filter element 160 is positioned proximate the second end 167 such that the filter element 160 is horizontally oriented about center axis 195. As noted above, the air intake 138 is positioned on the same side (e.g., first end 165) of the air filter assembly 102 as the filter outlet 168. The positioning of the air intake 138 relative to the filter outlet 168 results in three passes of the air flow within the air filter assembly 102 prior to entering the air-fuel mixing device 128.

The incoming air flows into the air intake 138 positioned on the first end 165 and into the cyclonic airflow path 192 established within the gap 157 toward the second end 167 as designated by first airflow pass 105. Accordingly, when completing the first airflow pass 105 (e.g., completing at least one cyclonic air flow turn or pass around the filter element 160), the incoming air moves from the air intake 138 toward the debris outlet 142 positioned proximate the second end portion 167. The overall flow of air in the first airflow pass 105 is in a first direction from the first 165 toward the second end 167. The flow of air in the first airflow pass 105 moves cyclonically around the filter element 160 but in a horizontal overall direction generally from end 165 toward end 167 Next, the air flows through the filter media 161 of the filter element 160 and toward the filter outlet 168 positioned proximate the first end 165 as designated by second airflow pass 107. As such, the second airflow pass 107 is substantially parallel but opposite in direction to the first airflow pass 105. The flow of air in the second airflow pass 107 moves in a horizontal overall direction generally from end 167 toward end 165, which is opposite in direction to the first air flow pass 105. Finally, the air flows into the filter outlet 168 and turns back toward the second end 167 as designated by third airflow pass 109 prior to entering elbow 158 that connects to the air-fuel mixing device 128. The outlet conduit 156 is configured to direct air in the third airflow pass 109 toward the final outlet 171 in a substantially parallel direction to the first airflow pass 105 and second airflow pass 107. Additionally, the third airflow pass 109 is in substantially the same direction as the first airflow pass 105, but opposite in direction as the second airflow pass 107. The flow of air in the third air flow pass 109 moves in a horizontal overall direction generally from end 165 toward end 167, which is the same direction as the first air flow pass 105 and opposite the second air flow pass 107. The three air flow passes 105, 107, and 109 are arranged in counter flow arrangements to the adjacent air flow pass or passes so that the air moving through the three air flow passes travels in a first direction in the first air flow pass 105, is redirected in a second opposite direction in the second air flow pass 107, and returns to the first direction in the third air flow pass 109. Arranging the three air flow passes 105, 107, and 109 helps to provide a relatively compact air filter assembly 102 that can provide both a cyclonic filtering stage and a filter media filtering stage and route the air filtered by both filtering stages to the air-fuel mixing device 128. Air flow passes are considered to be substantially the same direction when one air flow pass falls within plus or minus 25 degrees of the bearing of the referenced air flow pass in the same direction of travel. Air flow passes are considered to be substantially the opposite direction when one air flow pass falls within plus or minus 25 degrees of the bearing of the referenced air flow pass in the opposite direction of travel.

The ribs 150,152 create a cyclonic filtering effect within the housing 132 of the air filter assembly 102. As mentioned above, the position, dimension, and angle of the ribs 150, 152 are configured to maintain a target exit velocity (e.g., 30 ft/s) at the debris outlet 142. Additionally, the position, dimension, and angle of the ribs 150, 152 may be selected such that incoming air completes at least two cyclonic passes in the gap 157 prior to entering the filter element 160. The combination of the target exit velocity and at least two cyclonic filtering passes increases the amount of debris removed from the air during the cyclonic filtering stage.

The boss 121 of the filter element 160 has an outer diameter 123 that is small relative to the outer diameter 124 of the body 122 of the end 162 of the filter element 160 so that the boss 121 does not interfere with the cyclonic air flow near the end 162 of the filter element 160. In one embodiment, the outer diameter 123 of the boss 121 is no larger than half the outer dimeter 124 of the body 122 to avoid interfering with the cyclonic air flow near the end 162 of the filter element 160.

Using the dimensions of the air intake 138, housing 132, ribs 150, 152, gap 157, and other components described herein, the velocity of the air flow within the housing 132 during cyclonic filtering is maintained at appropriate values so as to reduce any possible turbulent air flow and maintain laminar flow of the incoming air. Maintaining laminar flow within the housing 132 during cyclonic filtration is desirable for maximum possible cyclonic filtering. The target velocity of the air at the debris outlet 142 is approximately 30 feet per second (ft/s) to maintain laminar flow for desirable cyclonic filtering. In other arrangements, the target velocity of the air at the debris outlet 142 can be more or less than 30 ft/s.

Cyclonic filtering of intake air prior to filtering by a filter element as described above can facilitate longer engine runtime with a single filter. Because a large portion of debris is filtered prior to the air entering the filter, less debris is accumulated on the filter media. Thus, a filter assembly with cyclonic filtering will allow longer engine runtimes with a single filter. During filter testing conducted by Applicant, the air filter assembly 102 enabled the test engine to run longer (5 hours versus almost 2 hours) before being starved for air to the combustion process and collect less debris on the filter element (5 grams versus 2 grams), indicating improved cyclonic filtering, when compared to a conventional air filter assembly.

Figure 17:
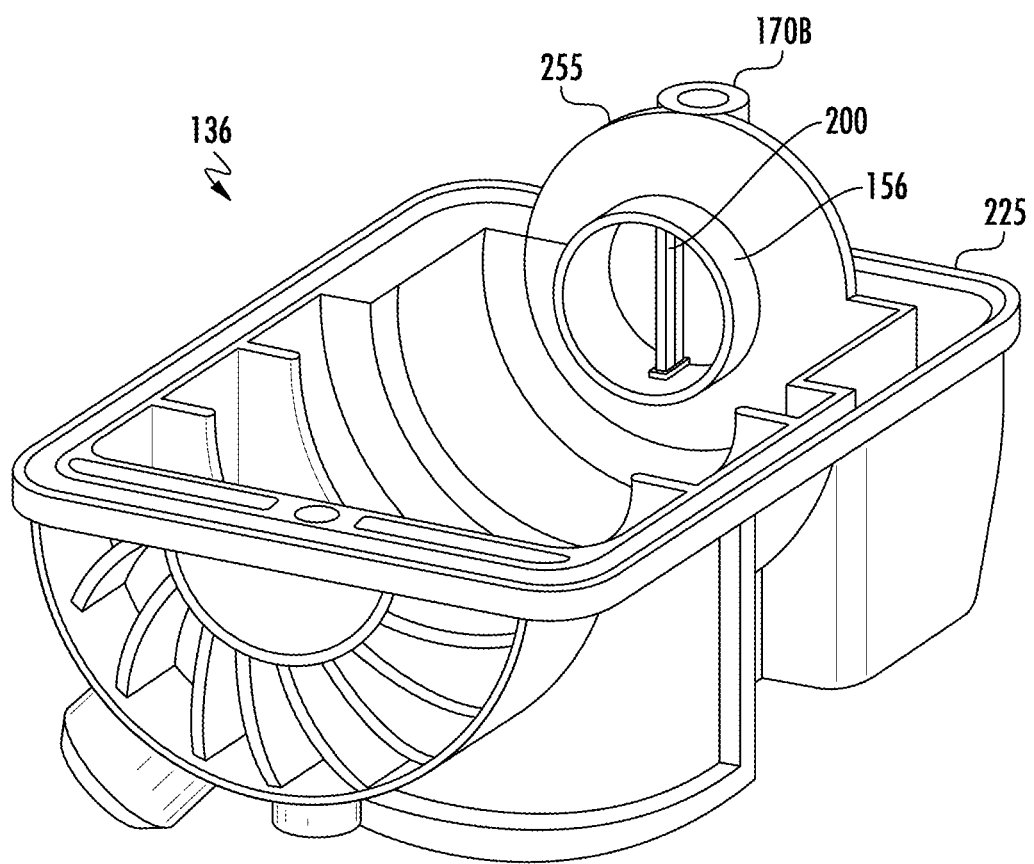
FIG. 17 is another perspective view of the base of FIG. 16.
Figure 18:
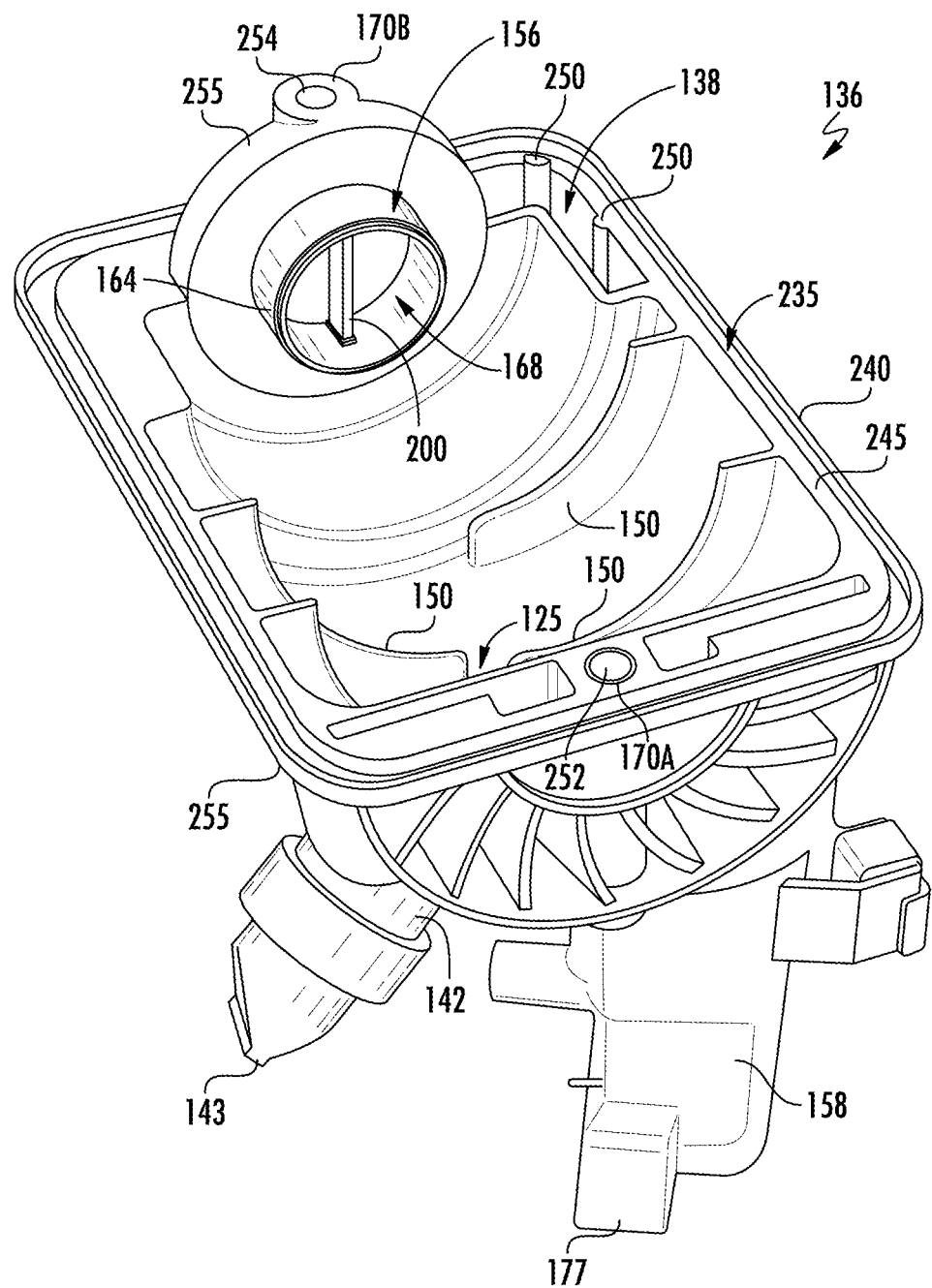
FIG. 18 is another perspective view of the base of FIG. 16.
Figure 19:
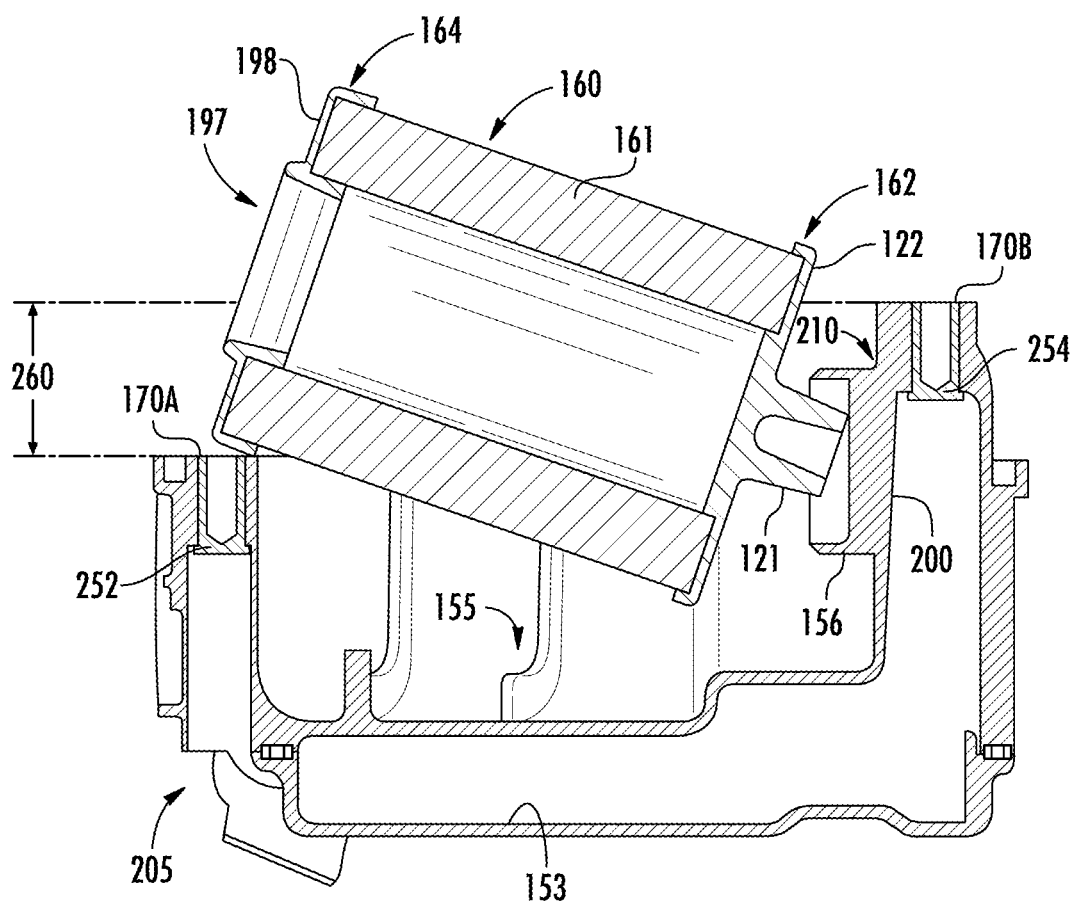
FIG. 19 is a section view of the base of FIG. 16 and an air filter element.

An alternative embodiment of the base 136 is illustrated in FIGS. 16-21. As shown in FIGS. 17-19, the air filter conduit 156 includes a crossbar 200 (bar, wall, projection) positioned in the filter outlet 168. As illustrated the crossbar 200 is set back from the edge of the boss 169 of the air filter conduit 156. In other embodiments, the crossbar 200 extends to the edge of the boss 169. As illustrated, the crossbar 200 is positioned vertically within the filter outlet 168 and positioned in the center of the filter outlet 168. In other embodiments, the crossbar 200 is positioned horizontally within the filter outlet 168 or at other angles within the filter outlet 168. In some embodiments, the crossbar 200 is one of multiple crossbars arranged in a grid or mesh within the filter outlet 168. As shown in FIG. 19, the crossbar 200 functions to limit insertion of the boss 121 of the filter element 160 into the air filter conduit 156. When the filter element 160 is properly installed in the interior volume 155 of the housing 132, the end 162 of the filter element 160 including the boss 121 is positioned away from the air filter conduit 156. The inclusion of the crossbar 200 within the air filter conduit 156 prevents improper installation of the filter element 160 with the end 162 positioned near the air filter conduit 156 by limiting insertion of the boss 121 into the air filter conduit 156. As shown in FIG. 19, when a user attempts to improperly install the filter element 160 in this manner, the boss 121 contacts the crossbar 200 and the opposite end 164 of the filter element 160 cannot be positioned within the interior volume 155. This arrangement error proofs assembly of the filter element 160 into the housing 132 so that the filter element 160 can only be positioned within the interior volume 155 when oriented in a first orientation with the first end 162 of the filter element 160 positioned near a first housing end portion 205 with the boss 121 in contact with the first housing end portion 205, and the second end 164 of the filter element 160 positioned near a second housing end portion 210 with the boss 169 or other portion of the air filter conduit 156 positioned within the opening 197 of the second end 164. In a second orientation of the filter element 160, the first end 162 of the filter element 160 is positioned near the second housing end portion 210 with the boss 121 in contact with the crossbar 200 of the filter outlet 168, thereby preventing installation of the filter element 160 within the interior volume 155, as shown in FIG. 19.

As shown in FIG. 20, the first housing end portion 205 includes a wall 215 that is in contact with the boss 121 when the filter element 160 is properly installed within the interior volume 155. In some embodiments, a recess 220 (shown in broken lines) is formed in the wall 215 and at least a portion of the boss 121 is positioned within the recess 220 when the filter element 160 is properly installed in the interior volume 155. As shown in FIG. 13, when the filter element 160 is properly installed within the interior volume 155 with the boss 121 contacting the first housing end portion 205, the first end 162 of the filter element 160 exerts a force on the air filter element 160 directed toward the second housing end portion 210 and the air filter conduit 156 to form the seal 178 between the second end 164 of the filter element 160 and the air filter conduit 156. The relatively hard first end 162 of the filter element 160 does not compress or deflect when the boss 121 contacts the first housing end portion 205 and forces the relatively soft second end 164 of the filter element 160 onto the air filter conduit 156. The relatively soft material of the second end 164 is chosen to help form an air tight seal 178 between the second end 164 and the air filter conduit 156.

As shown in FIGS. 18-21, the base 136 includes a mounting flange 225 that is arranged to align with and contact a corresponding mounting flange 230 of the cover 134 (as shown in FIG. 6) when the cover 134 is attached to the base 136. The mounting flange 225 is arranged in a horizontal plane that includes the longitudinal center axis 195 of the housing 132. The mounting flange 225 includes a recessed channel 235 that receives a gasket (not shown) to form a seal between the mounting flanges 225 and 230 of the base 136 and the cover 134. The channel 235 is formed between an outer wall 240 and an inner wall 245. Near the air intake 138, the inner wall 245 stops and the channel 235 is open to the air intake 138. One or more stakes or projections 250 are provided to help keep the gasket within the channel 235 near the air intake 138. The stakes 250 extend above the channel 235 so that the gasket is positioned between the stakes 250 and the outer wall 240. If the base 136 and the cover 134 are not properly sealed by the gasket, the lack of a seal may result in pressure loss in the interior volume 155 which could negatively impact the velocity of the cyclonic air flow. The gasket helps to prevent any moisture (e.g., rain) from entering the interior volume, which could negatively impact the function of the filter media 161 if the filter media 161 got wet.

As shown in FIGS. 19-21, the portion of the mounting flange 225 near the first housing end portion 205 includes a first fastener opening 170A. In some embodiments, as illustrated, the first fastener opening 170A includes a threaded insert 252 for coupling with a threaded fastener. A second fastener opening 170B is formed in an elbow 255 or other structure of the air filter conduit 156. In some embodiments, as illustrated, the second fastener opening 170B includes a threaded insert 254 for coupling with a threaded fastener. The elbow 255 extends above the mounting flange 225 and provides the structure for forming a portion of the air filter conduit 156. As shown in FIG. 19, the entrance to the first fastener opening 170A is spaced apart from the entrance to the second fastener opening 170B by a distance 260. In the normal operating position of the air filter assembly 102, the entrance to the second fastener opening 170B is located at a vertical elevation above the vertical elevation of the entrance to the first fastener opening 170A. Using the structure of the elbow 255 as a location for the second fastener opening 170B helps to reduce the material needed to form the base 136 by making dual use of the elbow 255 as both the structure of a portion of the air filter conduit 156 and the structure for receiving a fastener for attaching the cover 134 to the base 136. This arrangement also helps to keep the housing 132 relatively compact by allowing the portion of the mounting flange 225 near the second housing end portion 210 to be narrower than the portion of the mounting flange 225 near the first housing end portion 205 by not having to accommodate the space and material needed for the second fastener opening 170 in the mounting flange 225. As shown in FIG. 13, with the cover 134 and the base 136 in in an attached configuration in which the base mounting flange 225 is aligned with and in contact with the cover mounting flange 230, a third fastener opening 170C in the cover 134 is aligned with the first fastener opening 170A and a fourth fastener opening 170D in the cover 134 is aligned with the second fastener opening 170B. A first fastener 133A is inserted into the third fastener opening 170C and the first fastener opening 170A and attached to the base 136 (e.g., threads of the fastener 133A engage threads of the first fastener opening 170A or the threaded insert 252). A second fastener 133B is inserted into the fourth fastener opening 170D and the second fastener opening 170B and attached to the base 136 (e.g., threads of the fastener 133B engage threads of the second fastener opening 170B or the threaded insert 254).

FIGS. 20-21 also illustrate the trough 186 that leads to the debris outlet 142. The trough 186 includes a relatively wide entrance 262 that narrows to a relatively narrower exit 265. The relatively wide entrance 262 helps to gather debris and direct debris toward the exit 265 of the trough 186. The trough 186 is also pitched or angled between the entrance 262 to the exit 265 to direct debris from the entrance 262 toward the exit 265. This arrangement helps to funnel debris filtered from the air flow by the cyclonic filtering process from the entrance 262 toward the exit 265.

Figure 23:
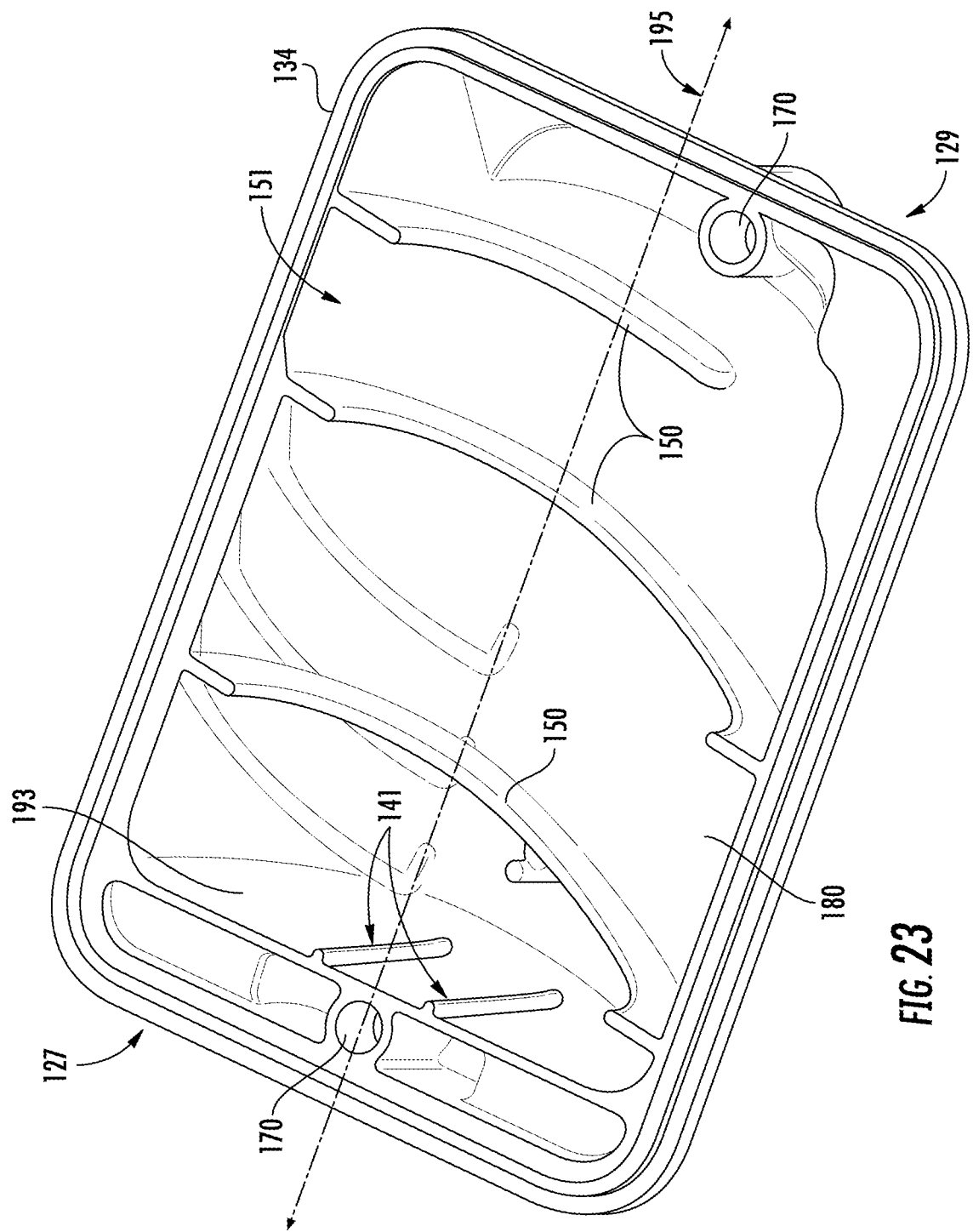
FIG. 23 is a perspective view of a cover of an air filter assembly, according to an exemplary embodiment.
Figure 24:
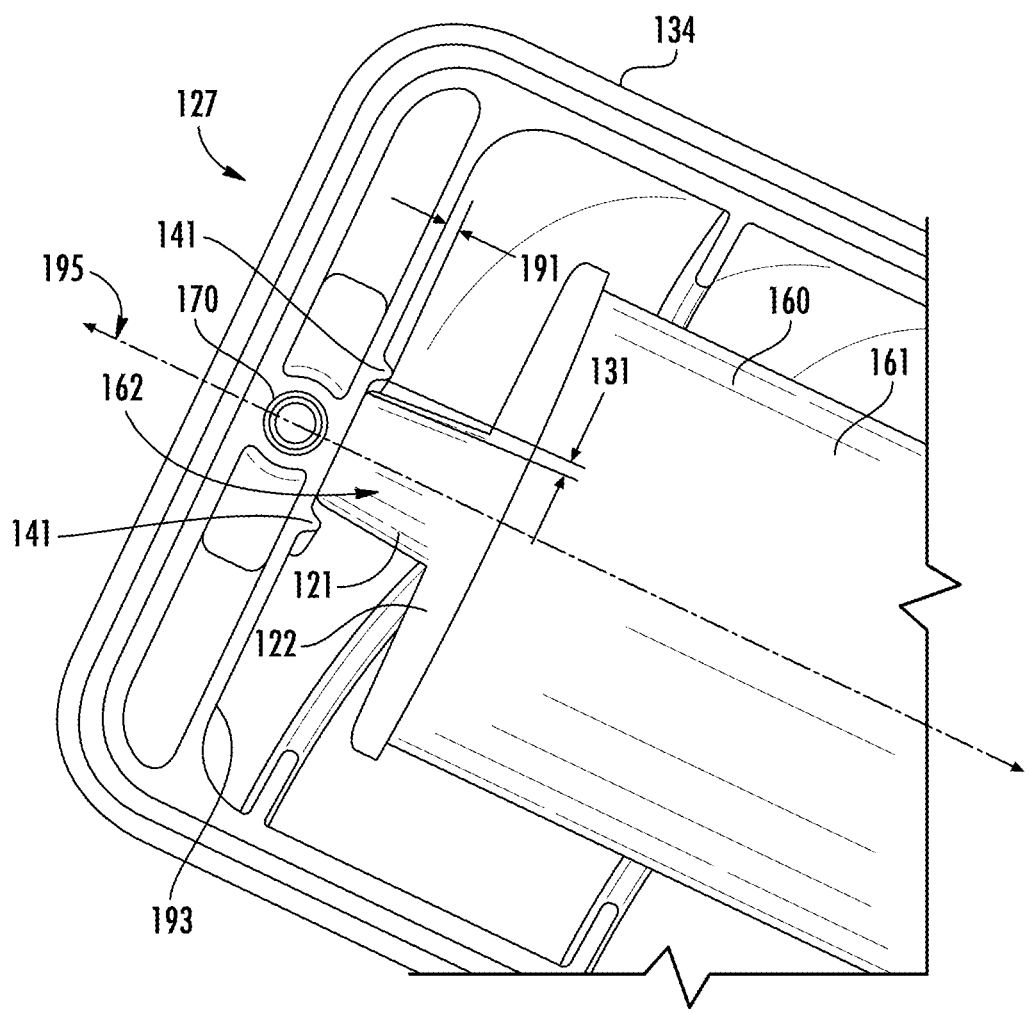
FIG. 24 is a detail view of the cover of FIG. 23.

An alternative embodiment of the cover 134 is illustrated in FIGS. 23 and 24. The cover 134 includes a first housing end 127 and a second housing end 129. The cover 134 includes two ribs 141 positioned at the first housing end 127. The ribs 141 protrude from an interior wall 193 formed within the first housing end 127. The first housing end 127 is configured to receive the boss 121 on the first end 162 of the filter element 160. As shown in FIG. 24, when assembled properly, the boss 121 of the filter element 160 fits between the ribs 141 and seals against wall 193. The ribs 141 limit the lateral movement of the first end 162 about longitudinal axis 195 of the filter housing 132. The ribs 141 are spaced apart from the boss 121 at a lateral distance 131 on each side of the boss 121. In some embodiments, the lateral distance 131 is approximately 1.5 millimeters (mm). The ribs 141 project from the wall 193 on the first housing end 127 a projection distance 191. In some embodiments, the projection distance 191 is approximately 2 mm.

The construction and arrangements of the air filter assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An internal combustion engine, comprising:
   an engine block including a cylinder;
   an air-fuel mixing device configured to provide an air-fuel mixture to the cylinder;
   an air filter assembly configured to provide filtered air to the air-fuel mixing device, comprising:
      a housing comprising a base and a cover, wherein the base and the cover define an interior volume, wherein the housing comprises an air intake, a filtered air outlet, and an outlet passage fluidly coupling the filtered air outlet to a final air outlet;
      a filter element positioned within the interior volume, the filter element divides the interior volume into a filtered volume and an unfiltered volume; and
      a gap between the filter element and the housing configured to direct air in a first airflow pass before being filtered by the filter element;
      wherein the filter element is configured to direct filtered air in a second airflow pass in a substantially opposite direction from the first airflow pass; and
      wherein the outlet passage is configured to direct filtered air into a third airflow pass in a substantially same direction as the first airflow pass.

2. The engine of claim 1, wherein the cover is configured to releasably fasten to the base, and wherein the housing comprises a first housing end portion and a second housing end portion.

3. The engine of claim 2, wherein the base comprises the air intake, the filtered air outlet, and the outlet passage.

4. The engine of claim 2, wherein the first housing end portion comprises the air intake and the filtered air outlet, and wherein the second housing end portion comprises a debris outlet configured to allow debris and air to exit the housing.

5. The engine of claim 2, wherein the gap is configured to direct air in the first airflow pass in a direction from the first housing end portion toward the second housing end portion.

6. The engine of claim 1, wherein the housing further comprises a plurality of ribs formed in the cover and the base to direct air from the air intake toward a debris outlet formed in the base.

7. The engine of claim 6, further comprising a trough formed in the base near the debris outlet, wherein the trough narrows from an entrance to an exit and is configured to direct debris toward the debris outlet.

8. The engine of claim 6, wherein the plurality of ribs extend more than halfway into the gap.

9. The engine of claim 6, wherein the plurality of ribs in the cover comprise helical ribs and the plurality of ribs in the base comprise helical ribs.

10. The engine of claim 6, wherein the plurality of ribs in the cover align with the plurality of ribs in the base to form a plurality of angled air channels within the housing.

11. The engine of claim 10, wherein the first of the plurality of angled air channels is narrower than a remainder of the plurality of angled air channels;
    wherein the first of the plurality of angled air channels is positioned proximate the air intake such that air enters the first of the plurality of angled air channels before entering the remainder of the plurality of angled air channels.

12. The engine of claim 1, wherein the air intake comprises an L-shape having a first portion and a second portion;
    wherein the first portion is configured to direct incoming air flow to substantially complete a first filtering pass within a first angled air channel before joining with incoming air flow from the second portion.

13. The engine of claim 1, wherein the air filter assembly is oriented horizontally with the engine in a normal operating position.

14. An air filter assembly configured to provide filtered air to an engine, comprising:
    a housing comprising a cover and a base, wherein the cover and the base define an interior volume of the housing;
    a filter element positioned within the interior volume and comprising filter media, the filter element divides the interior volume into a filtered volume and an unfiltered volume;
    an air intake formed in the base and configured to allow air to flow into the housing;
    a debris outlet formed in the base and configured to allow debris and air to exit the housing;
    a filtered air outlet formed in the base, wherein the filtered air outlet is fluidly coupled to an air-fuel mixing device to allow filtered air to exit the housing and enter the air-fuel mixing device;
    a gap between the filter element and the housing configured to allow air to flow between the filter element and the housing; and
    a plurality of ribs formed in the cover and the base configured to direct air to complete at least two cyclonic filtering passes within the gap before being filtered by the filter element.

15. The air filter assembly of claim 14, wherein the plurality of ribs extend more than halfway into the gap.

16. The air filter assembly of claim 14, wherein the plurality of ribs in the cover align with the plurality of ribs in the base to form a plurality of angled air channels within the housing.

17. The air filter assembly of claim 16, wherein one of the plurality of angled air channels is narrower than a remainder of the plurality of angled air channels;
    wherein the one of the plurality of angled air channels is positioned proximate the air intake such that incoming air enters the one of the plurality of angled air channels before entering the remainder of the plurality of angled air channels.

18. The air filter assembly of claim 14, further comprising a trough formed in the base near the debris outlet, wherein the trough is configured to direct debris toward the debris outlet.

19. The air filter assembly of claim 14, wherein air flows into the housing from the air intake based on intake pressure pulses created from reciprocation of a piston.

20. An internal combustion engine, comprising:
- an engine block including a cylinder;
- an air-fuel mixing device configured to provide an air-fuel mixture to the cylinder;
- an air filter assembly configured to provide filtered air to the air-fuel mixing device, comprising:
  - a housing comprising a base and a cover, the cover is configured to releasably fasten to the base, the housing defining a first housing end portion and a second housing end portion, wherein the base and the cover define an interior volume;
  - a filter element positioned within the interior volume, the filter element divides the interior volume into a filtered volume and an unfiltered volume;
  - an outlet passage formed in the base fluidly coupling a filtered air outlet to a final air outlet, the filtered air outlet in fluid communication with the filtered volume of the filter element;
- an air intake formed in the housing at the first housing end portion and configured to allow air to flow into a gap between the filter element and the housing, wherein the gap is configured to direct air in a first airflow pass in a direction from the first housing end portion toward the second housing end portion before being filtered by the filter element;
- wherein the filter element is configured to direct filtered air in a second airflow pass in a substantially opposite direction from the first airflow pass; and
- wherein the outlet passage is configured to direct filtered air into a third airflow pass in a substantially same direction as the first airflow pass.

* * * * *